(12) United States Patent
Furukawa

(10) Patent No.: US 11,349,648 B2
(45) Date of Patent: May 31, 2022

(54) PRE-CALCULATION DEVICE, METHOD, COMPUTER-READABLE RECORDING MEDIUM, VECTOR MULTIPLICATION DEVICE, AND METHOD

(71) Applicant: NEC Corporation, Tokyo (JP)

(72) Inventor: Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 84 days.

(21) Appl. No.: 17/025,001

(22) Filed: Sep. 18, 2020

(65) Prior Publication Data

US 2021/0005112 A1     Jan. 7, 2021

Related U.S. Application Data

(62) Division of application No. 16/060,082, filed as application No. PCT/JP2016/086352 on Dec. 7, 2016, now Pat. No. 10,972,260.

(30) Foreign Application Priority Data

Dec. 10, 2015 (JP) ................ 2015-241251

(51) Int. Cl.
*H04L 9/08* (2006.01)
*G09C 1/00* (2006.01)
*G06F 17/16* (2006.01)

(52) U.S. Cl.
CPC ........... *H04L 9/085* (2013.01); *G09C 1/00* (2013.01); *H04L 9/0869* (2013.01); *G06F 17/16* (2013.01); *H04L 2209/46* (2013.01)

(58) Field of Classification Search
CPC ..... H04L 9/085; H04L 9/0869; H04L 2209/46; G09C 1/00; G06F 17/16
See application file for complete search history.

(56) References Cited

U.S. PATENT DOCUMENTS

| 9,536,114 B1 | 1/2017 | El Defrawy et al. |
| 10,083,310 B1* | 9/2018 | Lampkins ............ H04L 9/3093 |
| 2012/0002811 A1* | 1/2012 | Smart .................... H04L 9/085 380/255 |

OTHER PUBLICATIONS

U.S. NOA for U.S. Appl. No. 16/060,082 dated Dec. 4, 2020.
Tal Rabin et al., "Verifiable Secret Sharing and Multiparty Protocols with Honest Majority (Extended Abstract)", STOC 1989, pp. 73-85, Cited in the Specification.

(Continued)

*Primary Examiner* — Huan V Doan
(74) *Attorney, Agent, or Firm* — Sughrue Mion, PLLC

(57) ABSTRACT

Provided is a pre-calculation device capable of keeping a secret against malicious behaviors of participants while keeping a processing load small. A Beaver triple generation processor generates a secret-shared Beaver triple formed of two secret-shared random numbers and a secret-shared value of a product of the two random numbers. A Beaver triple random inspection processor randomly selects a secret-shared Beaver triple, restores the Beaver triple through communication to and from other pre-calculation devices, and confirms that a product of first two elements is equal to a third element. The Beaver triple position stirring processor randomly replaces Beaver triples that have not been restored, to generate replaced secret-shared Beaver triples.

6 Claims, 12 Drawing Sheets

(56) References Cited

OTHER PUBLICATIONS

Oded Goldreich et al., "How to Solve any Protocol Problem—An Efficiency Improvement", CRYPTO 1987, pp. 73-86, Cited in the Specification.

Van Damgard et al., "Multiparty Computation from Somewhat Homomorphic Encryption", CRYPTO 2012, pp. 343-662, Cited in the Specification.

Zamani, Mahdi et al., "Millions of Millionaires: Multiparty Computation in Large Networks", Cryptology ePrint archive Report 2014/149, Mar. 2014, pp. 1-26, Ver.20140324:034602, Cited in ISR.

Demmler, Daniel et al., "ABY—A Framework for Efficient Mixed-Protocol Secure Two-Party Computation", Proceedings of the 2015 Network and Distributed System Security (NDSS) Symposium, Feb. 2015, pp. 1-15, Cited in ISR.

International Search Report for PCT Application No. PCT/JP2016/086352, dated Mar. 7, 2017.

English translation of Written opinion for PCT Application No. PCT/JP2016/086352.

Damgård et al., "Multiparty Computation for Dishonest Majority: From Passive to Active Security at Low Cost", International Conference on Computer Analysis of Images and Patterns, CAIP 2017, Aug. 15, 2010, pp. 558-576 (total 19 pages).

Pullonen et al., "Actively Secure Two-Party Computation: Efficient Beaver Triple Generation", Master's Thesis (30 ETCS), University of Tartu, Jan. 1, 2013, pp. 1-89 (total 89 pages).

Beaver, "Secure Multiparty Protocols and Zero-Knowledge Proof Systems Tolerating a Faulty Minority", Journal of Cryptology, Jan. 1, 1991, vol. 4, pp. 75-122 (total 48 pages).

Communication dated Jun. 17, 2019 from European Patent Office in counterpart EP Application No. 16873010.9.

\* cited by examiner

PRE-CALCULATION DEVICE, METHOD, COMPUTER-READABLE RECORDING MEDIUM, VECTOR MULTIPLICATION DEVICE, AND METHOD

The present application is a divisional application of Ser. No. 16/060,082 filed on Jun. 7, 2018, which is a National Stage Entry of PCT/JP2016/086352 filed on Dec. 7, 2016, which claims priority from Japanese Patent Application 2015-241251 filed on Dec. 10, 2015, the contents of all of which are incorporated herein by reference, in their entirety.

TECHNICAL FIELD

This invention relates to a pre-calculation device, a method, a computer-readable recording medium, a vector multiplication device, and a method.

BACKGROUND ART

A secret calculation method is a method of calculating a given function by a plurality of secret calculation devices performing calculation while communicating to and from one another. Moreover, the secret calculation method has such a characteristic that none of the secret calculation devices can acquire information on input/output to/from the function unless data to be handled are shared by a sufficient number of devices.

As a publicly known secret calculation method, a method described in Non Patent Document 1 is known.

The method described in Non Patent Document 1 involves distributing a secret S, which is a value in a certain field, to a plurality of devices by using a polynomial F satisfying $F(0)=S$ in this field. It is assumed that when the number of devices is N and the number of secrets is less than K, the information on the input/output to/from the function cannot be acquired. In this technical field, such a technology is referred to as "secret sharing". It is also assumed that values of the field that differ depending on the device are assigned, and that the value of the field assigned to the i-th device is denoted by $X[i]$, where $1 \le i \le N$.

When a secret A is distributed to the plurality of devices, $F[i]:=F(X[i])$ of a randomly selected (K-1)th-order polynomial F satisfying $F(0)=A$ is distributed to each i-th device.

Similarly, for a secret B, $G[i]:=G(X[i])$ of a (K-1)th-order polynomial G satisfying $G(0)=B$ is distributed to each i-th device.

Regarding the secrets, the (K-1)th-order polynomials can be solved by a group of K or more devices. Thus, coefficients of F or G can be obtained, and F(0) or G(0) can consequently be calculated.

In order to calculate a value where A+B is distributed, each i-th device calculates $H[i]=F[i]+G[i]$. This value is $H(X[i])$ acquired by assigning $X[i]$ to the polynomial H having coefficients, each of which is a sum of corresponding coefficients of F and G, and is thus a value acquired by distributing A+B to the plurality of devices as in the cases of the secret A and the secret B.

As in the cases of the secret A and the secret B, the (K-1)th-order polynomial can be solved by a group of K or more devices. Thus, coefficients of H can be acquired, and H(0) can consequently be calculated.

When $K*2 \le N+1$, in order to calculate a value when A*B is distributed, each i-th device calculates $H[i]=F[i]*G[i]$. This value is $H(X[i])$ acquired by assigning $X[i]$ to the 2K-th-order polynomial $H(X)=F(X)*G(X)$, and is thus a value acquired by distributing A*B to the plurality of devices as in the cases of the secret A and the secret B. The order of H is 2K, which is different from the cases of the secret A and the secret B, and hence the 2K-th-order polynomial can be solved by a group of 2K or more devices. Thus, coefficients of H can be acquired, and H(0) can consequently be calculated.

The distribution method for A*B is different from that for the secret A and the secret B. In order to distribute A*B in the form of using the (K-1)th-order polynomial, each i-th device generates a (K-1)th-order polynomial G from H[i], and distributes $G(X[j])$ to each j-th device. With the method disclosed in Non Patent Document 1, all functions constructed by sums and products can be calculated in this way.

As another publicly known secret calculation method, a method described in Non Patent Document 2 is known.

Non Patent Document 2 includes a description relating to a method for a case where the number of devices is two. With this method, when two devices hold a bit, namely, an element b in the Galois field GF(2), in a distributed manner, b and c satisfying $b+c=b \mod 2$ are distributed to and held by the respective devices.

With this method, when a certain bit A and a certain bit B are distributed to a device 1 and a device 2, the device 1 holds C and E and the device 2 holds D and F, where $A=C+D \mod 2$ and $B=E+F \mod 2$. On this occasion, an exclusive OR G of the bit A and the bit B is $G=A+B \mod 2$, and the distributions thereof to the device 1 and the device 2 can be $H=C+E \mod 2$ and $J=D+F \mod 2$, respectively.

Each of the devices can calculate the distribution of the exclusive OR of the two distributed values through light calculation without communicating to and from the other device.

Similarly, when the bit A and the bit B are distributed and held, the following calculation is executed so that the device 1 acquires L and the device 2 acquires M, where L and M are respective distributions of an AND $K=A \cdot B$ of those two bits, that is, satisfy $L+M=K \mod 2$.

The device 1 randomly generates L. On this occasion, $M=(C+D) \cdot (E+F)=L \mod 2$, and the device 1 thus returns the following values to the device 2 without knowing the value of M in accordance with the values D and F held by the device 2. When $(D, F)=(0, 0)$, $M=(C+0) \cdot (E+0)+L \mod 2$ is returned. When $(D, F)=(0,1)$, $M=(C+0) \cdot (1+E)+L \mod 2$ is returned. When $(D, F)=(1, 0)$, $M=(1+C) \cdot (E+0)+L \mod 2$ is returned. When $(D, F)=(1, 1)$, $M=(1+C) \cdot (1+E)+L \mod 2$ is returned.

The device 1 transmits to the device 2 the value dependent on the input to the device 2. The method in which the device 1 cannot know the input to the device 2 is implemented by a technology referred to as "oblivious transfer" between the device 1 and the device 2. However, this technology generally requires both devices to perform a large amount of calculation and communication.

The secret calculation methods disclosed in Non Patent Documents 1 and 2 assume that each device behaves honestly.

In contrast, in Non Patent Document 3, there is described a method that secures safety when a fixed number or more of devices behave honestly even under a situation in which the other devices behave maliciously. In this context, the phrase "behave maliciously" refers to a failure to transmit a valid value to the other party at the time of communication. Further, the phrase "secure safety" refers to prevention of acquiring a secret held by the other party by transmitting a false value.

In the secret calculation method disclosed in Non Patent Document 3, both a secret and a message authenticator of the secret are held by secret sharing, and it is confirmed whether or not secret calculation of both the secret and the message authenticator results in a match with a final calculation result and a message authenticator thereof. With this, it is possible to confirm that malicious participants have not wrongly transmitted false values to the other party in secret calculation. In the secret calculation, three pairs, each consisting of a random number and a message authenticator thereof in which a third pair is equal to a result of multiplying the first two pairs, are pre-calculated, and the result is used in multiplication of the secret calculation. Homomorphic encryption is used to pre-calculate those three pairs.

PRIOR ART DOCUMENTS

Non Patent Documents

Non Patent Document 1: Tal Rabin, Michael Ben-Or: Verifiable Secret Sharing and Multiparty Protocols with Honest Majority (Extended Abstract). STOC 1989: 73-85

Non Patent Document 2: Oded Goldreich, Ronen Vainish: How to Solve any Protocol Problem—An Efficiency Improvement. CRYPTO 1987: 73-86

Non Patent Document 3: Ivan Damgard, Valerio Pastro, Nigel P. Smart, Sarah Zakarias: Multiparty Computation from Somewhat Homomorphic Encryption. CRYPTO 2012:

SUMMARY OF THE INVENTION

Problem to be Solved by the Invention

The methods described in Non Patent Documents 1 to 3 have the following respective problems.

The methods described in Non Patent Documents 1 and 2 have problems in that the secret cannot be kept against malicious behaviors of participants.

Meanwhile, the method described in Non Patent Document 3 requires homomorphic encryption in pre-calculation, which is problematic in that the processing time is large.

Therefore, keeping a secret against malicious behaviors of participants while keeping the processing load small is a problem.

This invention has an object to provide a pre-calculation device, a method, a computer-readable recording medium, a vector multiplication device, a method, and a computer-readable recording medium, which solve at least one of the problems described above.

Means to Solve the Problem

A pre-calculation device according to this invention is a pre-calculation device capable of communicating to and from a plurality of other pre-calculation devices, the pre-calculation device comprising: a Beaver triple generation processor configured to generate a large number of secret-shared Beaver triples by repeatedly using a function of generating two secret-shared random numbers and causing the pre-calculation device and the plurality of other pre-calculation devices to communicate a secret-shared value of a product of the two secret-shared random numbers to one another for generation thereof, to thereby cause the pre-calculation device and the plurality of other pre-calculation devices to secret share a combination of three values including the two secret-shared random numbers and the product thereof; a Beaver triple random inspection processor configured to: randomly select a secret-shared Beaver triple from among the large number of secret-shared Beaver triples; restore the secret-shared Beaver triple by the pre-calculation device and the plurality of other pre-calculation devices communicating the secret-shared Beaver triple to one another; and confirm that a product of first two elements is equal to a third element by using a value of the restored Beaver triple; and a Beaver triple position stirring processor configured to randomly replace Beaver triples that have not been restored, to generate replaced secret-shared Beaver triples.

A pre-calculation calculation method according to this invention is a pre-calculation calculation method, which is performed by a pre-calculation device capable of communicating to and from a plurality of other pre-calculation devices, the pre-calculation calculation method comprising: generating, by a Beaver triple generation processor, a large number of secret-shared Beaver triples by repeatedly using a function of generating two secret-shared random numbers and causing the pre-calculation device and the plurality of other pre-calculation devices to communicate a secret-shared value of a product of the two secret-shared random numbers to one another for generation thereof, to thereby cause the pre-calculation device and the plurality of other pre-calculation devices to secret share a combination of three values including the two secret-shared random numbers and the product thereof; randomly selecting, by a Beaver triple random inspection processor, a secret-shared Beaver triple from among the large number of secret-shared Beaver triples; restoring, by the Beaver triple random inspection processor, the secret-shared Beaver triple by the pre-calculation device and the plurality of other pre-calculation devices communicating the secret-shared Beaver triple to one another; confirming, by the Beaver triple random inspection processor, that a product of first two elements is equal to a third element by using a value of the restored Beaver triple; and randomly replacing, by a Beaver triple position stirring processor, Beaver triples that have not been restored, to generate replaced secret-shared Beaver triples.

A pre-calculation program according to this invention is a pre-calculation program for causing a computer of a pre-calculation device capable of communicating to and from a plurality of other pre-calculation devices to function as: Beaver triple generation processing means for generating a large number of secret-shared Beaver triples by repeatedly using a function of generating two secret-shared random numbers and causing the pre-calculation device and the plurality of other pre-calculation devices to communicate a secret-shared value of a product of the two secret-shared random numbers to one another for generation thereof, to thereby cause the pre-calculation device and the plurality of other pre-calculation devices to secret share a combination of three values including the two secret-shared random numbers and the product thereof; Beaver triple random inspection processing means for: randomly selecting a secret-shared Beaver triple from among the large number of secret-shared Beaver triples; decrypting the secret-shared Beaver triple by the pre-calculation device and the plurality of other pre-calculation devices communicating the secret-shared Beaver triple to one another; and confirming that a product of first two elements is equal to a third element by using a value of the decrypted Beaver triple; and Beaver triple position sorting processing means for randomly sorting Beaver triples that have not been decrypted, to generate sorted secret-shared Beaver triples.

In addition, a vector multiplication device according to this invention is a vector multiplication device, which is capable of communicating to and from a plurality of other vector multiplication devices, the vector multiplication device comprising: a pre-calculation input processor configured to generate secret-shared data on Beaver triples or be supplied with the secret-shared data on Beaver triples; an input processor configured to be supplied with a plurality of pieces of secret-shared data on a combination of two numbers to be multiplied by each other; an auxiliary vector generation processor configured to: add each element of the secret-shared data on Beaver triples to each piece of secret-shared data on the combination of two numbers to be multiplied by each other; and generate an auxiliary vector, which is a result of disclosure by the vector multiplication device and the plurality of other vector multiplication devices communicating secret-shared data on an addition result to one another; and a vector multiplication processor configured to generate secret-shared data on a vector multiplication result based on the auxiliary vector and the secret-shared data on Beaver triples.

A vector multiplication method according to this invention is a vector multiplication method, which is performed by a vector multiplication device capable of communicating to and from a plurality of other vector multiplication devices, the vector multiplication method comprising: generating, by a pre-calculation input processor, secret-shared data on Beaver triples, or being supplied with, by the pre-calculation input processor, secret-shared data on Beaver triples; being supplied with, by an input processor, a plurality of pieces of secret-shared data on a combination of two numbers to be multiplied by each other; adding, by an auxiliary vector generation processor, each element of the secret-shared data on Beaver triples to each piece of secret-shared data on the combination of two numbers to be multiplied by each other; and generating, by the auxiliary vector generation processor, an auxiliary vector, which is a result of disclosure by the vector multiplication device and the plurality of other vector multiplication devices communicating secret-shared data on an addition result to one another; and generating, by a vector multiplication processor, secret-shared data on a vector multiplication result based on the auxiliary vector and the secret-shared data on Beaver triples.

According to one embodiment of this invention, there is provided a vector multiplication program for causing a computer of a vector multiplication calculation device capable of communicating to and from a plurality of other vector multiplication devices to function as: pre-calculation input processing means for generating secret-shared data on Beaver triples or inputting the secret-shared data on Beaver triples; input processing means for inputting a plurality of pieces of secret-shared data on a combination of two numbers to be multiplied by each other; auxiliary vector generation processing means for: adding each element of the secret-shared data on Beaver triples to each piece of secret-shared data on the combination of two numbers to be multiplied by each other; and generating an auxiliary vector, which is a result of disclosure by the vector multiplication device and the plurality of other vector multiplication devices communicating secret-shared data on an addition result to one another; and vector multiplication processing means for generating secret-shared data on a vector multiplication result based on the auxiliary vector and the secret-shared data on Beaver triples.

Effect of the Invention

According to this invention, it is possible to keep a secret against malicious behaviors of participants while keeping the processing load small.

MODES FOR EMBODYING THE INVENTION

Description of Symbols and Definitions

Figure 1:
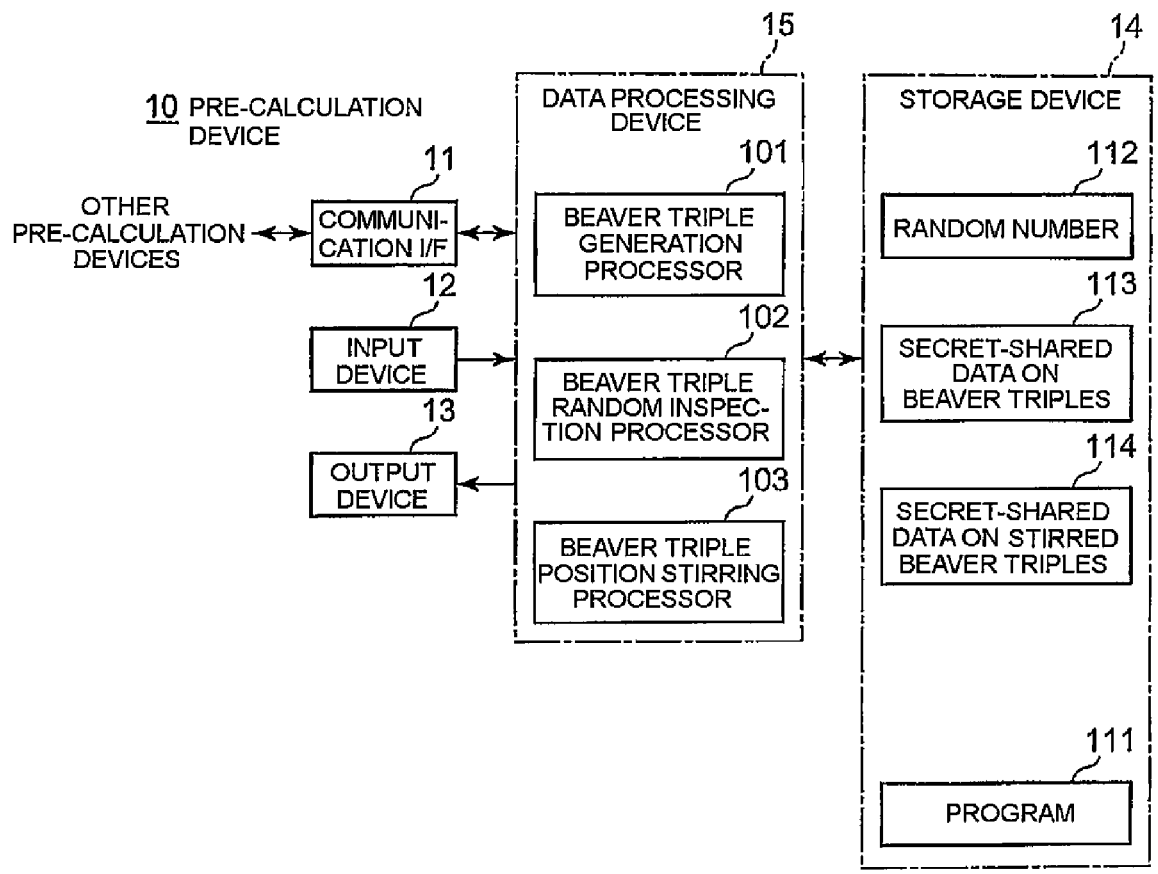
FIG. 1 is a block diagram for illustrating a hardware configuration of a pre-calculation device constructing a pre-calculation system in a first example embodiment of this invention.

First, a description will be given of symbols, for example, operators used in this invention, and definitions thereof to facilitate understanding of this invention.

Now, calculation of N-dimensional vectors with elements of a field F is described. Two vectors of x and y are given, and i-th elements thereof are denoted by $x[i]$ and $y[i]$, respectively. When a result of adding the vectors x and y is denoted by z, an i-th element of z is defined to be $z[i]=x[i]+y[i]$.

In the context of this invention described below, this addition method is easy and wildly known. Thus, this addition method is not described below any more.

When a result of multiplying the vectors x and y is denoted by z, an i-th element of z is defined to be z[i]=x[i] y[i]. This invention is the invention relating to this multiplication.

When the above-mentioned addition and multiplication of vectors are enabled, those calculations can be used to execute a large amount of addition and multiplication of elements of the field F at the same time. For example, a case is supposed in which a polynomial P is calculated for N inputs. In this case, the same number of vectors as those of variables of the polynomial P are prepared, a k-th vector is assigned to a k-th variable, and an i-th input element is assigned to an i-th element of each vector. Evaluation of the polynomial P for N inputs results from evaluation of the single polynomial P for a plurality of input N-dimensional vectors. That is, respective multiplications and additions forming the polynomial P are executed at the same time for all the inputs by addition and multiplication of vectors.

It is assumed that a safety variable is denoted by M and a vector dimension is denoted by N. This invention is particularly efficient when M<<N is satisfied. It is assumed that an integer is denoted by K. This invention is particularly efficient when M<<K is satisfied. It is assumed that an inspection rate is denoted by v. It is assumed that L is defined to be N(K+M)/(1−v). It is assumed that {M} represents {1, . . . , M}, {N} represents {1, . . . , N}, {K} represents {1, . . . , K}, and {L} represents {1, . . . , L}.

It is assumed that a field is denoted by F. It is assumed that <x> represents the fact that a value x is (t, n) secret shared. Specifically, under a state where each participant holds some piece of data on the value x, information on the value x is not revealed in any manner when (t−1) or smaller number of participants present their respective pieces of data, and the value x can be decrypted when t or larger number of participants present their respective pieces of data.

In this context, data held by each device is referred to as "share of secret sharing of x", or "share of x". It is assumed that this secret sharing enables acquisition of a (2t−1, n) secret share of a product z=xy of x and y from two (t, n) secret shares <x> and <y> without communication between the participants. It is assumed that this result is represented by <<z>>=<x>**<y>. It is assumed that there is a method of obtaining <z> from <<z>> through communication between the participants. It is assumed that this processing is represented by <z>=Reshare(<<z>>).

It is assumed that Open(<x>) denotes processing of obtaining x from <x> by all the participants. At this time, a result of decrypting x is obtained for all the combinations of t participants. This is because when a part of the participants has committed a fraud, some combinations of participants may result in a failure to decrypt a valid value. A participant who has not obtained the same value for all the combinations notifies detection of a fraud and ends the operation.

It is assumed that Random denotes processing of generating random elements of the field F that are (t, n) secret shared through participation of all the participants. It is assumed that Random' denotes processing of generating disclosed random elements of the field F. It is assumed that a product a<x>=<ax> of a disclosed value 'a' and a secret share <x> can be calculated without communication. In the processing of Reshare, Random, and Random', each participant consumes random variables.

It is assumed that <T[i, j]>=Random is generated for all i∈{M} and j∈{N}. In this case, <T[i, j]> for i∈{M} and j∈{N} is a value obtained by secret sharing a key of a message authenticator, which is referred to as "secret-shared key of message authenticator" or "secret-shared data on key of message authenticator".

Example Embodiment 1

FIG. 1 is a block diagram for illustrating a hardware configuration of a pre-calculation device 10 constructing a pre-calculation system in a first example embodiment of this invention. The illustrated pre-calculation device 10 may be implemented by a computer operating in accordance with program control.

The illustrated pre-calculation system comprises a safe pre-calculation system configured to calculate Beaver triples.

The pre-calculation system comprises a system including the plurality of pre-calculation devices 10 capable of communicating to and from one another.

The pre-calculation device 10 comprises a communication interface (hereinafter referred to as "communication I/F") 11, an input device 12 configured to be supplied with data, an output device 13 configured to produce data, a storage device 14 for storing a program and data described later, and a data processing device 15 configured to process data.

The communication I/F 11 comprises a dedicated data communication line. The communication I/F 11 has a function of transmitting and receiving data via a communication network (not shown) or in a wireless manner. Specifically, the communication I/F 11 transmits data to other pre-calculation devices, and receives data from other pre-calculation devices. The communication I/F 11 also has a function of sending the received data to the data processing device 15.

The input device 12 comprises a keyboard, a mouse, and the like. The input device 12 has functions of detecting operation by an operator and of sending operation information to the data processing device 15.

The output device 13 comprises a printer and a display device such as a liquid crystal display (LCD) or a plasma display panel (PDP). The output device 13 has functions of displaying various kinds of information, for example, an operation menu, and of printing and producing a final result in accordance with an instruction from the data processing device 15.

The storage device 14 comprises a memory such as a hard disk drive, a read only memory (ROM), and a random access memory (RAM). The storage device 14 has a function of storing a program 111 and processing information (described later) required for various kinds of processing in the data processing device 15.

The data processing device 15 comprises a microprocessor, for example, a micro processing unit (MPU), or a central processing unit (CPU). The data processing device 15 has a function of implementing various processors configured to read the program 111 from the storage device 14 and to process data in accordance with the program 111.

Main processors implemented by the data processing device 15 comprise a Beaver triple generation processor 101, a Beaver triple random inspection processor 102, and a Beaver triple position stirring processor 103.

The Beaver triple generation processor 101 has a function of generating two secret-shared random numbers and causing the plurality of pre-calculation devices 10 to communicate a secret-shared value of a product of those two random numbers to one another for generation thereof, to thereby cause the plurality of pre-calculation devices 10 to secret share a combination of three values including the two random numbers and the product thereof. The Beaver triple generation processor 101 repeatedly uses this function to generate a large number of secret-shared Beaver triples.

The storage device 14 stores a random number 112 and secret-shared data 113 on Beaver triples generated by the Beaver triple generation processor 101. The secret-shared data 113 on Beaver triples is also referred to as "secret-shared Beaver triple".

The Beaver triple random inspection processor 102 randomly selects the secret-shared Beaver triple 113, and the plurality of pre-calculation devices 10 communicate the secret-shared Beaver triple 113 to one another, to thereby decrypt the Beaver triple. Then, the Beaver triple random inspection processor 102 uses the decrypted value of the Beaver triple to confirm that the product of first two elements is equal to a third element.

The result of success or failure of inspection by the Beaver triple random inspection processor 102 is produced by the output device 13.

The Beaver triple position stirring processor 103 randomly replaces (namely, stirs) the undecrypted Beaver triples to generate replaced secret-shared Beaver triples.

The storage device 14 stores secret-shared data 114 on stirred Beaver triples, which have been stirred by the Beaver triple position stirring processor 103. The secret-shared data 114 on stirred Beaver triples is also referred to as "replaced secret-shared Beaver triples".

Figure 2:
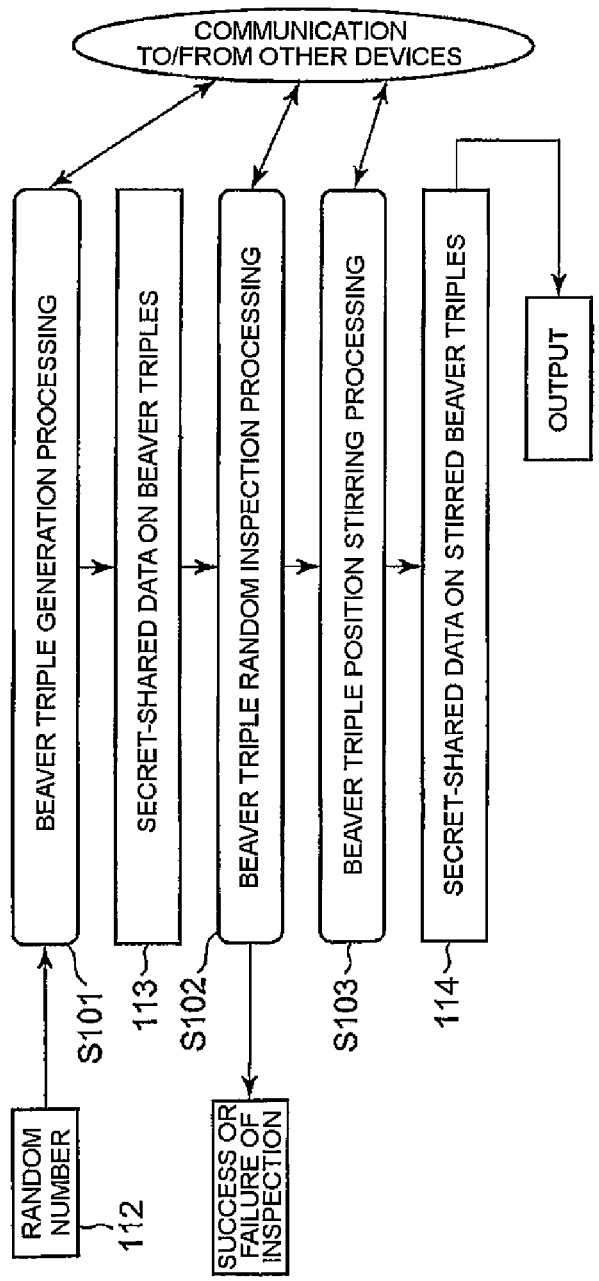
FIG. 2 is a flowchart for explaining operation of a data processing device used in the pre-calculation device illustrated in FIG. 1.

Next, with reference to FIG. 2, a more detailed description will be given of processing to be performed by the processors 101 to 103 of the data processing device 15 of FIG. 1.

The Beaver triple generation processor 101 first generates <a[j]>=Random for all j∈{L}. Next, the Beaver triple generation processor 101 generates <b[j]>=Random for all j∈{L}.

Then, the Beaver triple generation processor 101 generates <c[j]>=Reshare(<a[j]>**<b[j]>) for all j∈{L}.

When all the participants behave honestly, at this time, a validly secret-shared Beaver triple (<a[j]>, <b[j]>, <c[j]>) has been generated for all j∈{L}. The term "validly" herein refers to satisfaction of a relationship of a[j]b[j]=c[j]. The secret-shared Beaver triples are also referred to as "secret-shared data on Beaver triples".

This processing is referred to as "Beaver triple generation processing" (Step S101).

The Beaver triple random inspection processor 102 confirms whether or not Open(<c[j]>=Open(<a[j]>) Open(<b[j]>) is satisfied by choosing j's from among {L} in a fixed proportion v. When the Beaver triple random inspection processor 102 finds a combination that does not satisfy the above-mentioned relationship, the Beaver triple random inspection processor 102 detects a fraud and ends the processing.

This relationship is required be satisfied for Beaver triples, and thus unsatisfaction of this relationship means that some participant has committed a fraud. Further, Beaver triples are inspected in the fixed proportion v, and thus when a specific Beaver triple is not validly created, a probability that the Beaver triple is detected is this fixed proportion.

Further, when participants try to commit a fraud in creation of Beaver triples in a fixed proportion F, as the number L of generated Beaver triples becomes larger, the fraud is more likely to be detected. This is because L*f=F Beaver triples are not validly generated among L Beaver triples, and when L*v=V Beaver triples are inspected, the probability 1−(1−F/L)$^v$ of detection of the fraud becomes closer to 1 as L becomes larger. Therefore, as L becomes larger, F is required to be made smaller so that a fraud is less likely to be detected.

This processing is referred to as "Beaver triple random inspection processing" (Step S102).

When all the Beaver triples have been inspected, the Beaver triple position stirring processor 103 randomly replaces the left L-V combinations to obtain <a[j]>, <b[j]>, and <c[j]> for j∈{L-V}.

With the replacing described above, even when there is an illegal Beaver triple, its position becomes random.

This processing is referred to as "Beaver triple position stirring processing" (Step S103).

Next, a description will be given of effects of the pre-calculation system in the first example embodiment of this invention. There is an effect of enabling creation of a set of Beaver triples in which a proportion of illegal Beaver triples is equal to or smaller than a fixed value, with safe pre-calculation of Beaver triples.

Example Embodiment 2

Figure 3:
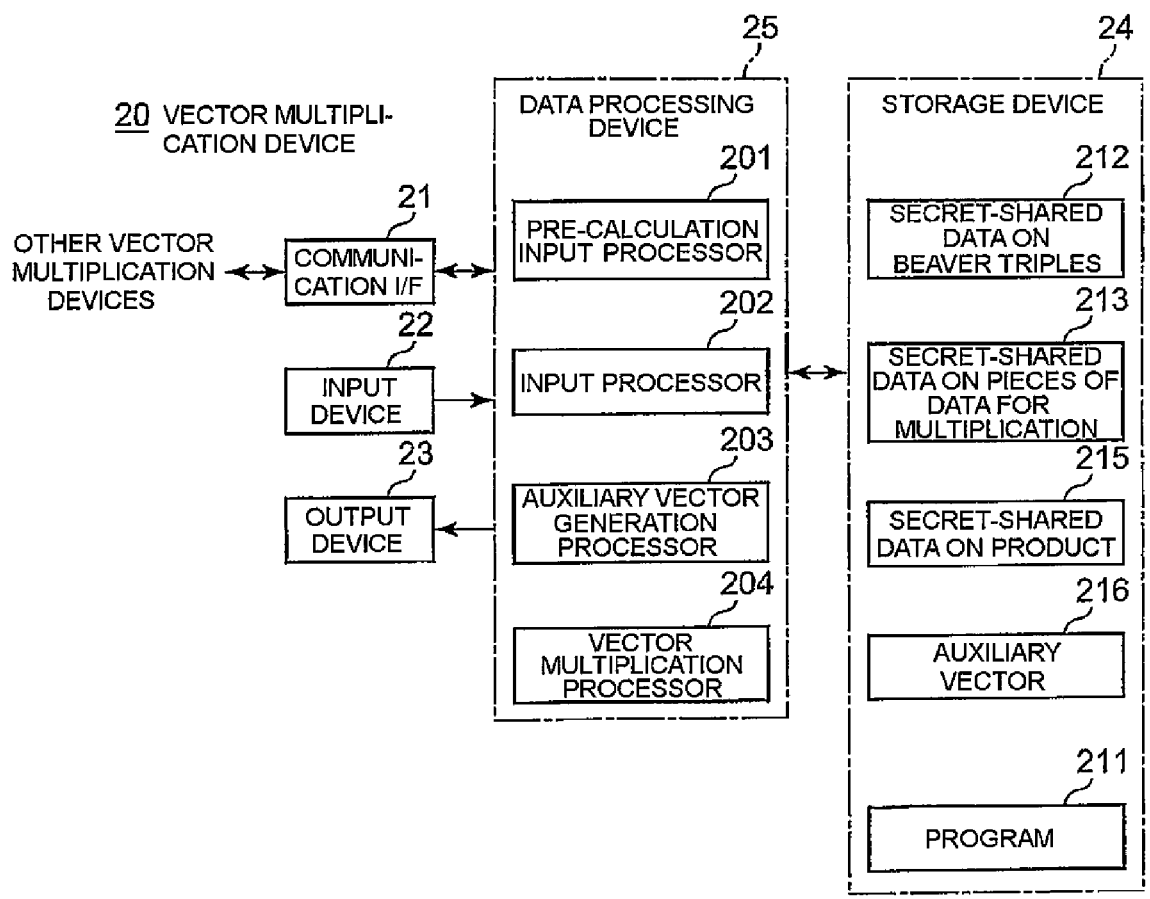
FIG. 3 is a block diagram for illustrating a hardware configuration of a vector multiplication device constructing a vector multiplication system in a second example embodiment of this invention.

FIG. 3 is a block diagram for illustrating a hardware configuration of a vector multiplication device 20 constructing a vector multiplication system in a second example embodiment of this invention. The illustrated vector multiplication device 20 may be implemented by a computer operating in accordance with program control.

The illustrated vector multiplication system comprises a latently safe vector multiplication system that uses Beaver triples.

The vector multiplication system comprises a system including the plurality of vector multiplication devices 20 capable of communicating to and from one another.

The vector multiplication device 20 comprises a communication interface (hereinafter referred to as "communication I/F") 21, an input device 22 configured to be supplied with input data, an output device 23 configured to produce data, a storage device 24 storing a program and data described later, and a data processing device 25 configured to process data.

The communication I/F 21 comprises a dedicated data communication line. The communication I/F 21 has a function of transmitting and receiving data via a communication network (not shown) or in a wireless manner. Specifically, the communication I/F 21 transmits data to other vector multiplication devices, and receives data from other vector multiplication devices. The communication I/F 21 also has a function of sending the received data to the data processing device 25.

The input device 22 comprises a keyboard, a mouse, and the like. The input device 22 has functions of detecting operation by an operator and of sending operation information to the data processing device 25.

The output device 23 comprises a printer and a display device such as a liquid crystal display (LCD) or a plasma display panel (PDP). The output device 23 has functions of displaying various kinds of information, for example, an operation menu, and of printing and producing a final result in accordance with an instruction from the data processing device 25.

The storage device 24 comprises a memory such as a hard disk drive, a read only memory (ROM), and a random access memory (RAM). The storage device 24 has a function of storing a program 211 and processing information (described later) required for various kinds of processing in the data processing device 25.

The data processing device 25 comprises a microprocessor, for example a micro processing unit (MPU), or a central processing unit (CPU). The data processing device 25 has a function of implementing various processors configured to read the program 211 from the storage device 24 and to process data in accordance with the program 211.

Main processors implemented by the data processing device 25 comprise a pre-calculation input processor 201, an input processor 202, an auxiliary vector generation processor 203, and a vector multiplication processor 204.

The pre-calculation input processor 201 generates or is supplied with secret-shared data 212 on Beaver triples.

The storage device 24 stores the secret-shared data 212 on Beaver triples that are generated or are supplied by the pre-calculation input processor 201. The secret-shared data 212 on Beaver triples is the same as the secret-shared data 114 on stirred Beaver triples, which is stored in the storage device 14 of FIG. 1.

The input processor 202 is supplied with a plurality of pieces of secret-shared data on a combination of two numbers to be multiplied by each other.

The storage device 24 stores secret-shared data 213 on pieces of data for multiplication, which is supplied from the input processor 202. The secret-shared data 213 on pieces of data for multiplication comprises secret-shared data on a combination of two numbers to be multiplied by each other.

The auxiliary vector generation processor 203 adds each element of secret-shared data on Beaver triples to each piece of secret-shared data on a combination of two numbers to be multiplied by each other, and generates an auxiliary vector 216, which is a result of disclosure by the plurality of vector multiplication devices 20 communicating secret-shared data on an addition result to one another.

The storage device 24 stores the auxiliary vector 216 generated by the auxiliary vector generation processor 203.

The vector multiplication processor 204 uses the auxiliary vector 216 to generate secret-shared data 215 on a product from the secret-shared data 212 on Beaver triples.

The storage device 24 stores the secret-shared data 215 on a product, which is generated by the vector multiplication processor 204. The secret-shared data on a product is also referred to as "secret-shared data on vector multiplication result".

Figure 4:
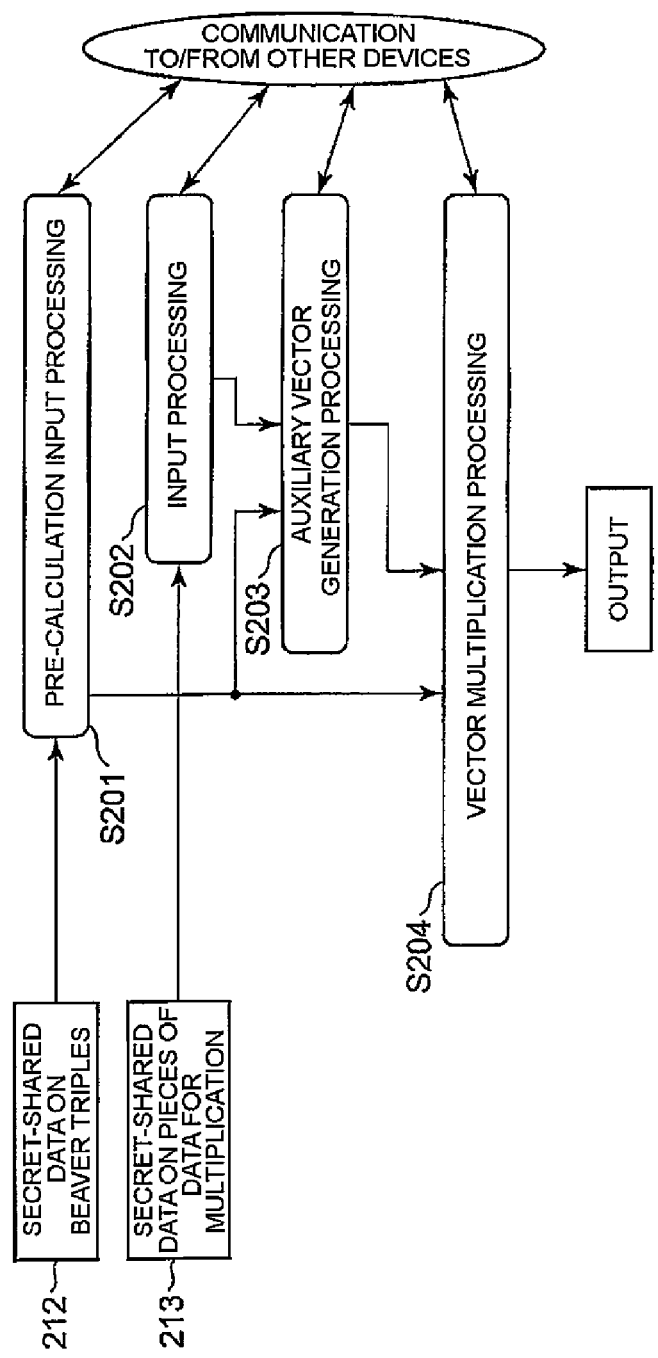
FIG. 4 is a flowchart for explaining operation of a data processing device used in the vector multiplication device illustrated in FIG. 3.

Next, referring to FIG. 4, a more detailed description will be given of processing to be executed by the processors 201 to 204 of the data processing device 25 of FIG. 3. $\{N\}$ is selected as a subset of $\{L\text{-}V\}$.

It is assumed that the pre-calculation input processor 201 is supplied with secret-shared data on Beaver triples described above for some k. This k is omitted here. That is, it is assumed that the pre-calculation input processor 201 is supplied with $<a[j]>$, $<b[j]>$, $<c[j]>$ for all $j \in \{N\}$.

Those values are expected to satisfy the following relationship.

$$c[j]=a[j]b[j] \text{ for all } j \in \{N\}.$$

This processing is referred to as "pre-calculation input processing" (Step S201).

It is assumed that the input processor 202 is supplied with $<x[j]>$, $<y[j]>$ for all $j \in \{N\}$ as elements to be multiplied by each other.

This processing is referred to as "input processing" (Step S202).

The auxiliary vector generation processor 203 first generates $d[j]=\text{Open}(<x[j]>+<a[j]>)$ for all $j \in \{N\}$.

Subsequently, the auxiliary vector generation processor 203 generates $e[j]=\text{Open}(<y[j]>+<b[j]>)$ for all $j \in \{N\}$.

This processing is referred to as "auxiliary vector generation processing" (Step S203).

The vector multiplication processor 204 generates $<z[j]>=<c[j]>+d[j]e[j]-e[j]<a[j]>-d[j]<b[j]>$ for all $j$ of $\{N\}$.

This processing is processing of multiplying vectors, and is a substantial object of this invention except for securing safety.

This processing is referred to as "vector multiplication processing" (Step S204).

Next, effects of the vector multiplication system in the second example embodiment of this invention will be described. Vector multiplication is performed on a set of Beaver triples by using a latently safe vector multiplication system that uses Beaver triples. Therefore, there is an effect of ensuring that each multiplication is performed validly in the same proportion as that of valid Beaver triples.

Example Embodiment 3

Figure 5:
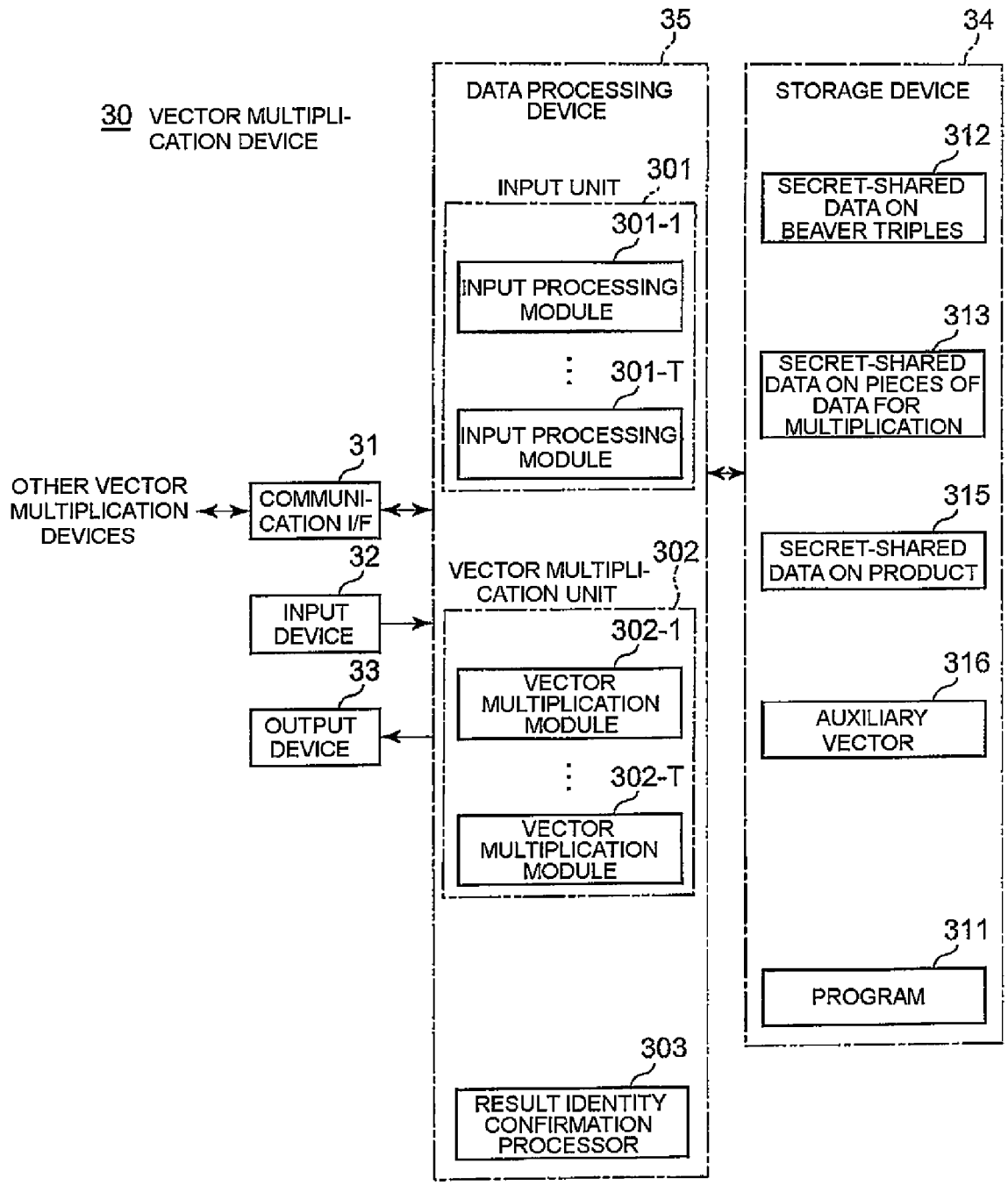
FIG. 5 is a block diagram for illustrating a hardware configuration of a vector multiplication device constructing a vector multiplication system in a third example embodiment of this invention.

FIG. 5 is a block diagram for illustrating a hardware configuration of the vector multiplication device 30 constructing a vector multiplication system in a third example embodiment of this invention. The illustrated vector multiplication device 30 may be implemented by a computer operating in accordance with program control.

The illustrated vector multiplication system comprises a safe vector multiplication system that uses Beaver triples.

The vector multiplication system comprises a system including the plurality of vector multiplication devices 30 capable of communicating to and from one another.

The vector multiplication device 30 comprises a communication interface (hereinafter referred to as "communication I/F") 31, an input device 32 configured to be supplied with data, an output device 33 configured to produce data, a storage device 34 storing a program and data described later, and a data processing device 35 configured to process data.

The communication I/F 31 comprises a dedicated data communication line. The communication I/F 31 has a function of transmitting and receiving data via a communication network (not shown) or in a wireless manner. Specifically, the communication I/F 31 transmits data to other vector multiplication devices, and receives data from other vector multiplication devices. The communication I/F 31 also has a function of sending the received data to the data processing device 35.

The input device 32 comprises a keyboard, a mouse, and the like. The input device 32 has functions of detecting operation by an operator and of sending operation information to the data processing device 35.

The output device 33 comprises a printer and a display device such as a liquid crystal display (LCD) or a plasma display panel (PDP). The output device 33 has functions of displaying various kinds of information, for example, an operation menu, and of printing and producing a final result in accordance with an instruction from the data processing device 35.

The storage device 34 comprises a memory such as a hard disk drive, a read only memory (ROM), and a random access memory (RAM). The storage device 34 has a function of storing a program 311 and processing information (described later) required for various kinds of processing in the data processing device 35.

The data processing device 35 comprises a microprocessor, for example a micro processing unit (MPU), or a central processing unit (CPU). The data processing device 35 has a function of implementing various processors configured to read the program 311 from the storage device 34 and to process data in accordance with the program 311.

Main processors implemented by the data processing device 35 comprise an input unit 301, a vector multiplication unit 302, and a result identity confirmation processor 303.

The input unit 301 comprises first to T-th (T is an integer of 2 or more) input processing modules 301-1 to 301-T. The first to T-th input processing modules 301-1 to 301-T each comprise the pre-calculation processor 201 and the input processor 202 included in the data processing device 25 of FIG. 3.

The vector multiplication unit 302 comprises first to T-th vector multiplication modules 302-1 to 302-T. The first to T-th vector multiplication modules 302-1 to 302-T each comprise the auxiliary vector generation processor 203 and the vector multiplication processor 204 included in the data processing device 25 of FIG. 3.

In other words, the first to T-th vector multiplication modules 302-1 to 302-T each execute a latently safe vector multiplication method that uses Beaver triples.

The result identity confirmation processor 303 confirms whether or not multiplication results of the first to T-th vector multiplication modules 302-1 to 302-T are all the same value.

The storage device 34 stores processing information similar to processing information stored in the storage device 24 illustrated in FIG. 3. That is, the storage device 34 stores secret-shared data 312 on Beaver triples, secret-shared data 313 on pieces of data for multiplication, secret-shared data 315 on a product, and an auxiliary vector 316. The storage device 34 stores T pieces of such information unlike the storage device 24.

Figure 6:
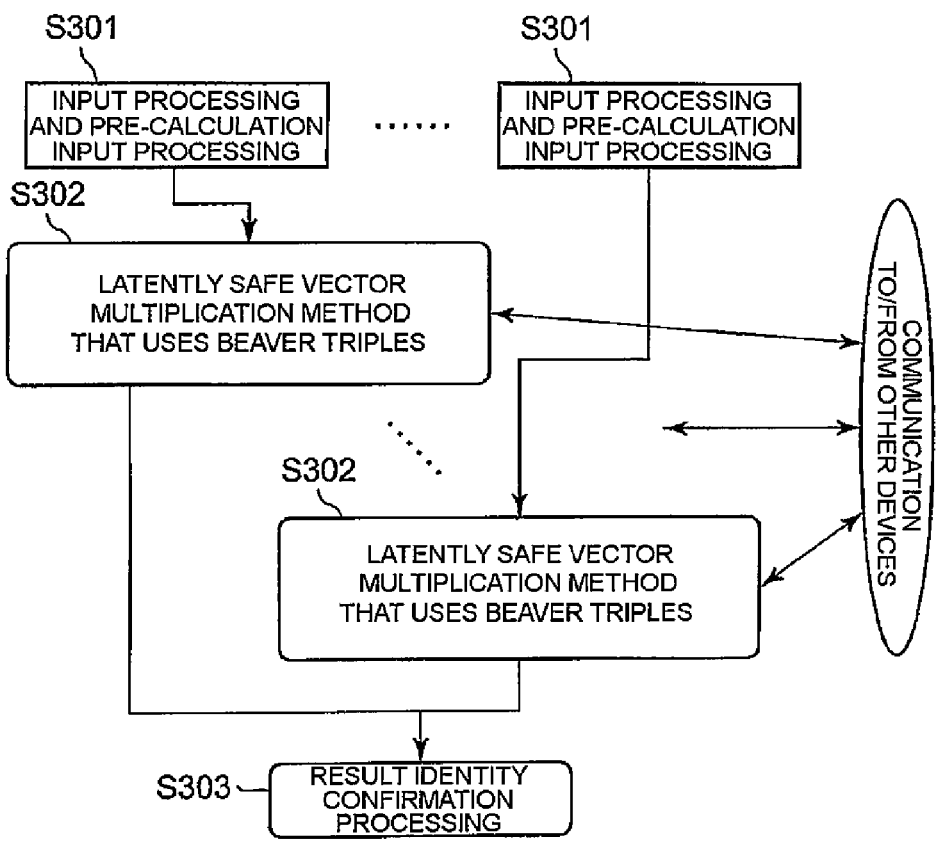
FIG. 6 is a flowchart for explaining operation of a data processing device used in the vector multiplication device illustrated in FIG. 5.

Next, referring to FIG. 6, a more detailed description will be given of processing to be performed by the processors 301 to 303 of the data processing device 35 of FIG. 5.

It is assumed that a duplicate number is denoted by T.

It is assumed that the input unit 301 has prepared inputs of the same T value for one input (Step S301), secret sharing of those inputs is independent of one another, and pieces of data held by respective participants for the same input are randomly distributed.

The vector multiplication unit 302 independently applies the latently safe multiplication method described above to T inputs (Step S302).

After the application, the result identity confirmation processor 303 confirms the identity of all the results in the following way.

It is assumed that T results for some j are denoted by $<z^{(1)}[j]>, \ldots, <z^{(T)}[j]>$.

The result identity confirmation processor 303 confirms whether or not $0=\text{Open}(<z^{(u)}[j]<=<z^{(u+1)}[j]>)$ for all $u=1, \ldots, T-1$.

This processing is referred to as "result identity confirmation processing" (Step S303).

Those results are probabilistically confirmed numerous times, to thereby be able to reduce the number of Open operations.

In the latently safe method according to the second example embodiment described above, unless Beaver triples are generated validly, whether or not the multiplication result is valid cannot be confirmed. On the contrary, when a large number of Beaver triples are created and a fixed proportion thereof is inspected with the method of inspecting Beaver triples, the number of illegal Beaver triples that can be mixed has been suppressed to only a small fixed proportion of all the Beaver triples.

In the third example embodiment, a plurality of calculations is performed at the same time, and each calculation is based on a different Beaver triple. Therefore, it is possible to sufficiently increase the probability of at least one calculation being based on a valid Beaver triple. After that, when results of all the calculations are confirmed to be the same, it is ensured that the results of all the calculations are the same as the calculation result that is based on a valid Beaver triple.

Next, effects of the vector multiplication system in the third example embodiment of this invention will be described. Vector multiplication is performed on a set of Beaver triples with a safe vector multiplication method that uses Beaver triples. Therefore, there is an effect of ensuring that each multiplication is performed validly at an extraordinary high probability.

In this calculation, Rehash, Open, and Rand operations require communication. Considering that the numbers of those operations satisfy M<<N<<K, 5 times of communication is required for one multiplication with the latently safe method, and 5T times of communication is required for one multiplication with the safe method.

Example Embodiment 4

Figure 7:
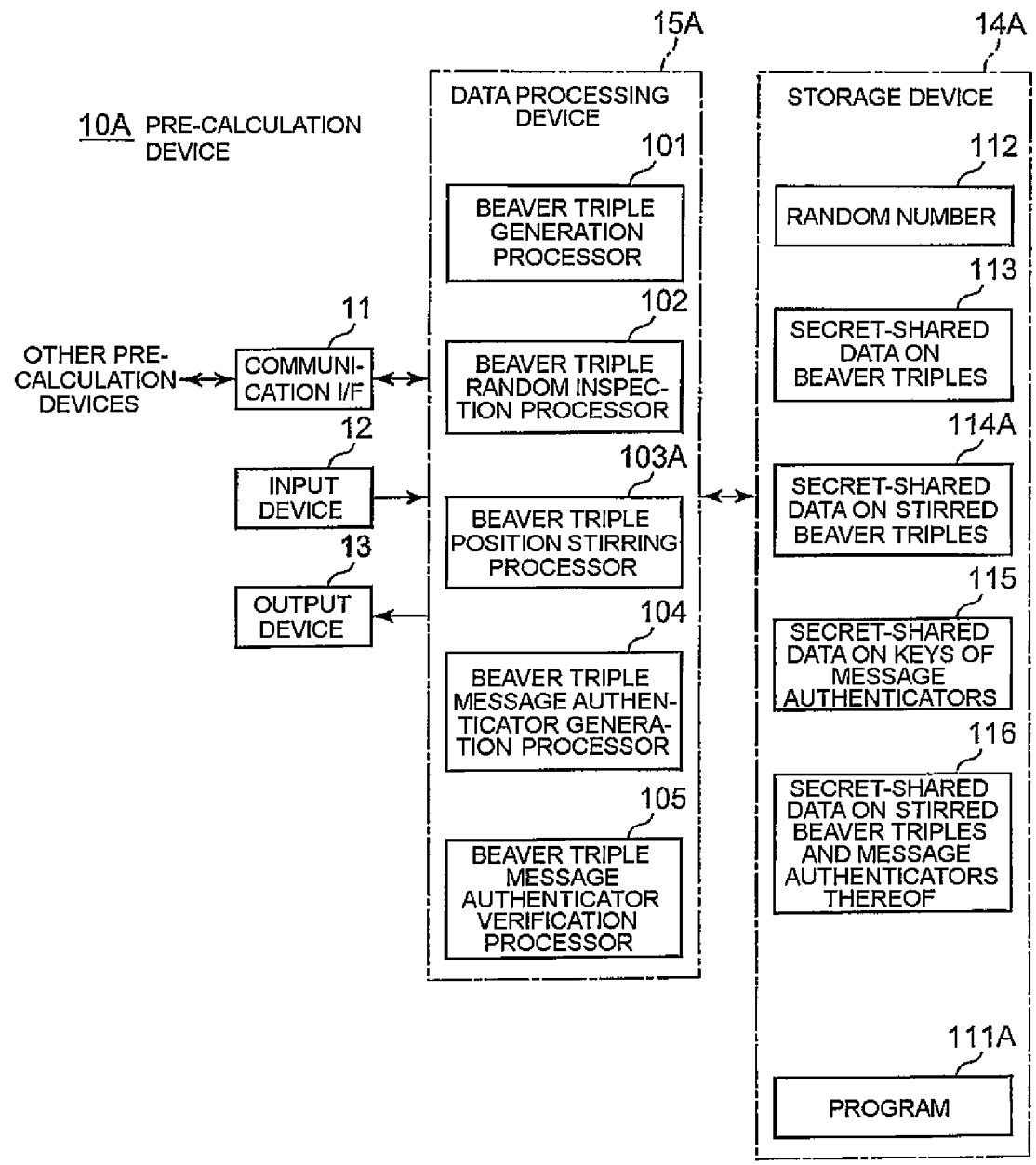
FIG. 7 is a block diagram for illustrating a hardware configuration of a pre-calculation device constructing a pre-calculation system in a fourth example embodiment of this invention.

FIG. 7 is a block diagram for illustrating a hardware configuration of a pre-calculation device 10A constructing a pre-calculation system in a fourth example embodiment of this invention. The illustrated pre-calculation device 10A may be implemented by a computer operating in accordance with program control.

The illustrated pre-calculation system comprises a safe pre-calculation system configured to calculate Beaver triples with message authenticators.

The pre-calculation system comprises a system including the plurality of pre-calculation devices 10A capable of communicating to and from one another. The plurality of pre-calculation devices 10A has a function of secret sharing and holding keys of message authenticators among those pre-calculation devices 10A.

The pre-calculation device 10A comprises a communication interface (hereinafter referred to as "communication I/F") 11, an input device 12 configured to be supplied with data, an output device 13 configured to produce data, a storage device 14A storing a program and data described later, and a data processing device 15A configured to process data.

The communication I/F 11 comprises a dedicated data communication line. The communication I/F 11 has a function of transmitting and receiving data via a communication network (not shown) or in a wireless manner. Specifically, the communication I/F 11 transmits data to other pre-calculation devices, and receives data from other pre-calculation devices. The communication I/F 11 also has a function of sending the received data to the data processing device 15A.

The input device 12 comprises a keyboard, a mouse, and the like. The input device 12 has functions of detecting operation by an operator and of sending operation information to the data processing device 15A.

The output device 13 comprises a printer and a display device such as a liquid crystal display (LCD) or a plasma display panel (PDP). The output device 13 has functions of displaying various kinds of information, for example, an operation menu, and of printing and producing a final result in accordance with an instruction from the data processing device 15A.

The storage device 14A comprises a memory such as a hard disk drive, a read only memory (ROM), and a random access memory (RAM). The storage device 14A has a function of storing a program 111A and processing information (described later) required for various kinds of processing in the data processing device 15A.

The data processing device 15A comprises a microprocessor, for example a micro processing unit (MPU), or a central processing unit (CPU). The data processing device 15A has a function of implementing various processors configured to read the program 111A from the storage device 14A and to process data in accordance with the program 111A.

Main processors implemented by the data processing device 15A comprise a Beaver triple generation processor 101, a Beaver triple random inspection processor 102, a Beaver triple position stirring processor 103A, a Beaver triple message authenticator generation processor 104, and a Beaver triple message authenticator verification processor 105.

That is, the data processing device 15A is different from the data processing device 15 illustrated in FIG. 1 in that the Beaver triple message authenticator generation processor 104 and the Beaver triple message authenticator verification processor 105 are newly added, and details of processing by the Beaver triple position stirring processor 103A are different.

The Beaver triple generation processor 101 has a function of generating two secret-shared random numbers and causing the plurality of pre-calculation devices 10A to communicate a secret-shared value of a product of those two random numbers to one another for generation thereof, to thereby cause the plurality of pre-calculation devices 10A to secret share a combination of three values including the two random numbers and the product thereof. The Beaver triple generation processor 101 repeatedly uses this function to generate a large number of secret-shared Beaver triples.

The storage device 14A stores a random number 112 and secret-shared data 113 on Beaver triples generated by the Beaver triple generation processor 101. The secret-shared data 113 on Beaver triples is also referred to as "secret-shared Beaver triple".

The Beaver triple random inspection processor 102 randomly selects the secret-shared Beaver triple 113, and the plurality of pre-calculation devices 10A communicate the secret-shared Beaver triple 113 to one another, to thereby decrypt the Beaver triple. Then, the Beaver triple random inspection processor 102 uses the decrypted value of the Beaver triple to confirm that the product of first two elements is equal to a third element.

The result of success or failure of inspection by the Beaver triple random inspection processor 102 is produced by the output device 13.

The Beaver triple position stirring processor 103A randomly replaces (namely, stirs) the unrecovered Beaver triples to generate replaced secret-shared Beaver triples with new indices.

The storage device 14A stores secret-shared data 114A on stirred Beaver triples, which have been stirred by the Beaver triple position stirring processor 103A. The secret-shared data 114A on stirred Beaver triples is also referred to as "replaced secret-shared Beaver triples".

The storage device 14A stores secret-shared data 115 on keys of message authenticators described above. The secret-shared data 115 on keys of message authenticators is also referred to as "secret-shared message authenticator key".

The Beaver triple message authenticator generation processor 104 uses the random number 112 and the secret-shared data 115 on keys of message authenticators to generate secret-shared message authenticators of the sorted secret-shared Beaver triples 114A by the plurality of pre-calculation devices 10A communicating the secret-shared message authenticator to one another.

The storage device 14A stores secret-shared data 116 on the stirred Beaver triples and message authenticators thereof. The secret-shared data 116 on the stirred Beaver triples and message authenticators thereof are also referred to as "secret-shared data on Beaver triples with message authenticators". Therefore, the secret-shared data 116 on Beaver triples with message authenticators comprises secret-shared Beaver triples and secret-shared message authenticators of those Beaver triples.

The Beaver triple message authenticator verification processor 105 performs the following restoration processing and confirmation processing. In the restoration processing, the Beaver triple message authenticator verification processor 105 generates a large number of linear combinations of the sorted secret-shared Beaver triples and randomly selected coefficients, and restores the large number of generated combinations to generate restored values. In the confirmation processing, the Beaver triple message authenticator verification processor 105 confirms that a large number of generated linear combinations of the secret-shared message authenticators of the Beaver triples and the coefficients, and a large number of generated linear combinations of the restored values and the secret-shared keys of message authenticators are the same.

The result of success or failure of verification by the Beaver triple message authenticator verification processor 105 is produced by the output device 13.

Figure 8:
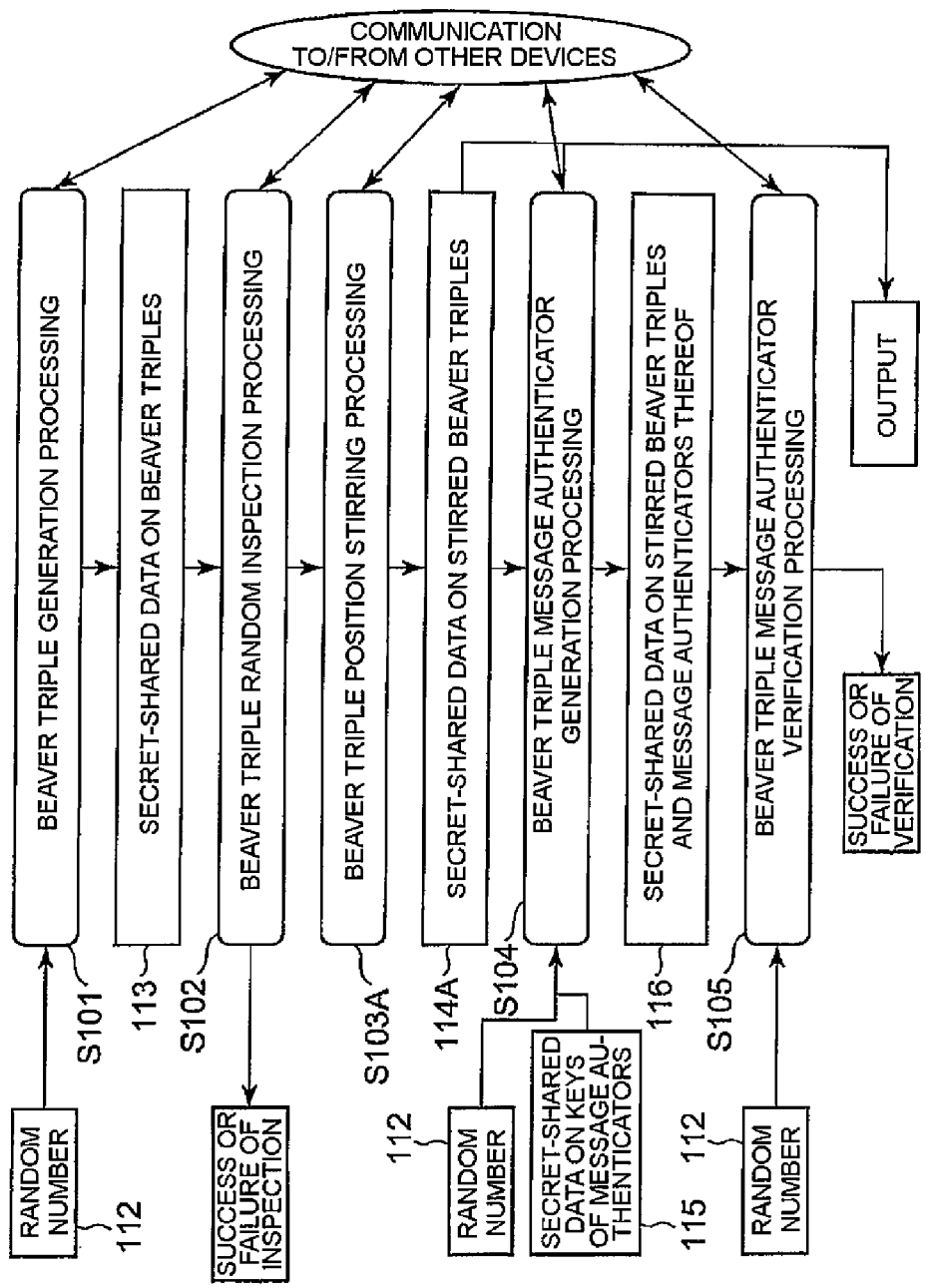
FIG. 8 is a flowchart for illustrating operation of a data processing device used in the pre-calculation device illustrated in FIG. 7.

Next, referring to FIG. 8, a more detailed description will be given of processing to be performed by the processors 101 to 105 of the data processing device 15A of FIG. 7.

The Beaver triple generation processor 101 first generates $<a[j]>$=Random for all $j \in \{L\}$. Subsequently, the Beaver triple generation processor 101 generates $<b[j]>$=Random for all $j \in \{L\}$.

Then, the Beaver triple generation processor 101 generates $<c[j]>$=Reshare($<a[j]>**<b[j]>$) for all $j \in \{L\}$.

When all the participants behave honestly, at this time, a validly secret-shared Beaver triple ($<a[j]>$, $<b[j]>$, $<c[j]>$) has been generated for all $j \in \{L\}$. The term "validly" herein refers to satisfaction of a relationship of $a[j]b[j]=c[j]$. The secret-shared Beaver triples are also referred to as "secret-shared data on Beaver triples".

This processing is referred to as "Beaver triple generation processing" (Step S101).

The Beaver triple random inspection processor 102 confirms whether or not Open($<c[j]>$=Open($<a[j]>$) Open($<b[j]>$) is satisfied by choosing j's from among $\{L\}$ in a fixed proportion v. When the Beaver triple random inspection processor 102 finds a combination that does not satisfy the above-mentioned relationship, the Beaver triple random inspection processor 102 detects a fraud and ends the processing.

This relationship is required be satisfied for Beaver triples, and thus unsatisfaction of this relationship means that some participant has committed a fraud. Further, Beaver triples are inspected in the fixed proportion v, and thus when a specific Beaver triple is not validly created, a probability that the Beaver triple is detected is this fixed proportion.

Further, when participants try to commit a fraud in creation of Beaver triples in a fixed proportion F, as the number L of generated Beaver triples becomes larger, the fraud is more likely to be detected. This is because L*f=F Beaver triples are not validly generated among L Beaver triples, and when L*v=V Beaver triples are inspected, the probability $1-(1-F/L)^v$ of detection of the fraud becomes closer to 1 as L becomes larger. Therefore, as L becomes larger, F is required to be made smaller so that a fraud is less likely to be detected.

This processing is referred to as "Beaver triple random inspection processing" (Step S102).

The Beaver triple position stirring processor 103A first sets K'=K+M, and sets {K'} as {1, . . . , K'}.

When all the Beaver triples have been inspected, the Beaver triple position stirring processor 103A randomly replaces the left N(K+M)=K'N combinations with new indices to obtain <a[j,k]>, <b[j,k]>, and <c[j,k]> for each of j∈{N} and k∈{K'}.

<c[j,k]>=<a[j,k]><b[j,k]> is satisfied for all j∈ and k∈{K'} when all the participants behave honestly.

With the replacing described above, even when there is an illegal Beaver triple, the position becomes random.

This processing is referred to as "Beaver triple position stirring processing" (Step S103A).

The Beaver triple message authenticator generation processor 104 first generates <A[i,k]>=Reshare($\Sigma_{j\in\{N\}}$<Γ[i,j]><a[j,k]>) for all i∈{M} and k∈{K'}. Similarly, the Beaver triple message authenticator generation processor 104 generates <B[i,k]>=Reshare($\Sigma_{j\in\{N\}}$<Γ[i,j]><b[j,k]>) for all i∈{M} and k∈{K'}. Further, the Beaver triple message authenticator generation processor 104 generates <C[i,k]>=Reshare($\Sigma_{j\in\{N\}}$<Γ[i,j]>**<c[j,k]>) for all i∈{M} and k∈{K'}.

A[i,k] for i∈{M} and k∈{K'} is a message authenticator of a[j,k] for j∈{N} and k∈{K'}.

B[i,k] for i∈{M} and k∈{K'} is a message authenticator of b[j,k] for j∈{N} and k∈{K'}.

C[i,k] for i∈{M} and k∈{K'} is a message authenticator of c[j,k] for j∈{N} and k∈{K'}.

The key of the message authenticator is Γ[i,j] for i∈{M} and k∈{K'}.

When the participants behave honestly, those message authenticators are secret shared.

This processing is referred to as "Beaver triple message authenticator generation processing" (Step S104).

The Beaver triple message authenticator verification processor 105 first generates A[m,k]=Random' for all m∈{M} and k∈{K'}. Subsequently, the Beaver triple message authenticator verification processor 105 generates a'[j,m]=Open($\Sigma_{j\in\{N\}}$Λ[m,k]<a[j,k]>) for all j∈ and m∈{M}. Further, the Beaver triple message authenticator verification processor 105 confirms whether or not 0=Open($\Sigma_{k\in\{K'\}}$Λ[m,k]<A[i,k]>-$\Sigma_{j\in\{N\}}$<Γ[i,j]>a'[j,m]) for all i∈{M} and m∈{M}.

Further, the Beaver triple message authenticator verification processor 105 generates ω[m,k]=Random' for all m∈{M} and k∈{K'}. Subsequently, the Beaver triple message authenticator verification processor 105 generates b'[j,m]=Open($\Sigma_{j\in\{N\}}$ω[m,k]<b[j,k]>) for all j∈ and m∈{M}. Then, the Beaver triple message authenticator verification processor 105 confirms whether or not 0=Open($\Sigma_{k\in\{K'\}}$ω[m,k]<B[i,k]>-$\Sigma_{j\in\{N\}}$<θ[i,j]>b'[j,m]) for all i∈{M} and m∈{M}.

Further, the Beaver triple message authenticator verification processor 105 first generates <Θ[m,k]>=Random' for all m∈{M} and k∈{K'}. Subsequently, the Beaver triple message authenticator verification processor 105 generates c'[j,m]=Open($\Sigma_{j\in\{N\}}$Θ[m,k]<c[j,k]>) for all j∈ and m∈{M}.

Then, the Beaver triple message authenticator verification processor 105 confirms whether or not 0=Open($\Sigma_{k\in\{K'\}}$Θ[m,k]<C[i,k]>-$\Sigma_{j\in\{N\}}$<Γ[i,j]>c'[j,m]) for all i∈{M} and m∈{M}.

The Beaver triple message authenticator verification processor 105 deletes all of <a[j,k]>, <A[i,k]>, <b[j,k]>, <B[j,k]>, <c[j,k]>, <C[j,k]> where k>K'-M:=K" is satisfied.

Each of a'[j,m], b'[j,m], and c'[j,m] for j∈ and m∈{M} is superimposition of each of message authenticators of a[j,k], b[j,k], and c[j,k] for all j∈ and k∈{K'}.

Considering the linearity of the message authenticator, all the message authenticators are confirmed to be the same by confirming 0=$\Sigma_{k\in\{K'\}}$Λ[m,k]A[i,k]-$\Sigma_{j\in\{N\}}$θ[i,j]>a'[j,m], 0=$\Sigma_{k\in\{K'\}}$Λ[m,k]B[i,k]-$\Sigma_{j\in\{N\}}$θ[i,j]>b'[j,m], 0=$\Sigma_{k\in\{K'\}}$Λ[m,k]C[i,k]-$\Sigma_{j\in\{N\}}$θ[i,j]>c'[j,m]. Since a'[j,m], b'[j,m], c'[j,m] are disclosed for j∈ and m∈{M}, the relationship among a[j,k], b[j,k], and c[j,k] is disclosed for j∈{N} and k∈{K'}. Therefore, a part thereof is deleted to obtain a set of Beaver triples that do not have a dependency relationship.

This processing is referred to as "Beaver triple message authenticator verification processing" (Step S105).

The data processing device 15A produces (a[j,k]>, <b[j,k]>, <c[j,k]>) for all j∈{N}, k ∈{K}, and (<A[i,k]>, <B[i,k]>, <C[i,k]>) for all k∈{K} and i∈{M}.

Next, a description will be given of effects of the pre-calculation system in the fourth example embodiment of this invention. There is an effect of enabling creation of a set of Beaver triples with message authenticators in which a proportion of illegal Beaver triples is equal to or smaller than a fixed value, with safe pre-calculation of Beaver triples with message authenticators.

Example Embodiment 5

Figure 9:
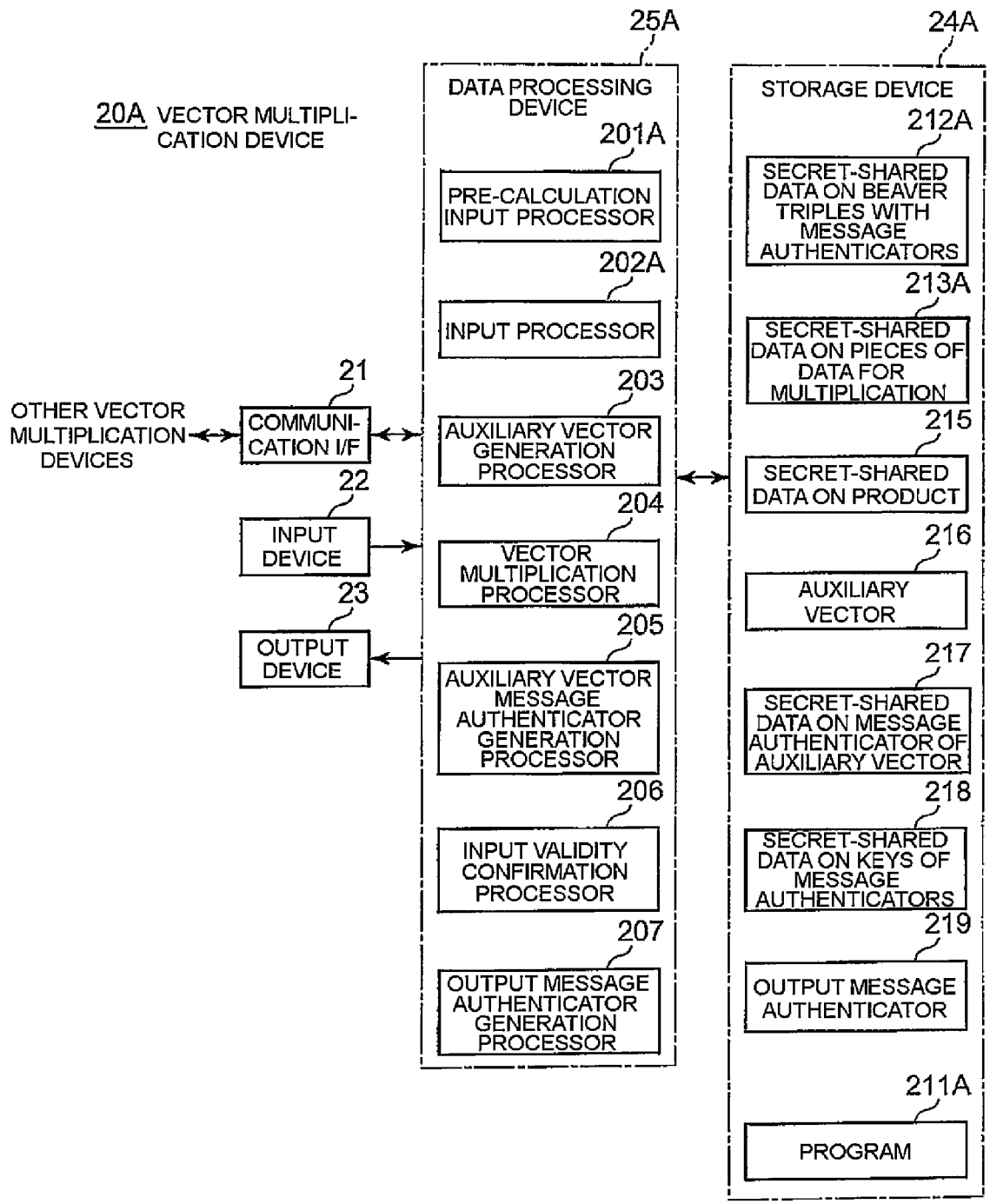
FIG. 9 is a block diagram for illustrating a hardware configuration of a vector multiplication device constructing a vector multiplication system in a fifth example embodiment of this invention.

FIG. 9 is a block diagram for illustrating a hardware configuration of a vector multiplication device 20A constructing a vector multiplication system in a fifth example embodiment of this invention. The illustrated vector multiplication device 20A may be implemented by a computer operating in accordance with program control.

The illustrated vector multiplication device comprises a latently safe vector multiplication system that uses Beaver triples with message authenticators.

The vector multiplication system comprises a system including the plurality of vector multiplication devices 20A capable of communicating to and from one another. The plurality of vector multiplication devices 20A have a function of secret sharing and holding keys of message authenticators among those vector multiplication devices 20A.

The vector multiplication device 20A comprises a communication interface (hereinafter referred to as "communication I/F") 21, an input device 22 configured to be supplied with data, an output device 23 configured to produce data, a storage device 24A storing a program and data described later, and a data processing device 25A configured to process data.

The communication I/F 21 comprises a dedicated data communication line. The communication I/F 21 has a function of transmitting and receiving data via a communication network (not shown) or in a wireless manner. Specifically, the communication I/F 21 transmits data to other pre-calculation devices, and receives data from other pre-calculation devices. The communication I/F 21 also has a function of sending the received data to the data processing device 25A.

The input device 22 comprises a keyboard, a mouse, and the like. The input device 22 has functions of detecting operation by an operator and of sending operation information to the data processing device 25A.

The output device 23 includes a printer and a display device such as a liquid crystal display (LCD) or a plasma display panel (PDP). The output device 23 has functions of displaying various kinds of information, for example, an operation menu, and of printing and producing a final result in accordance with an instruction from the data processing device 25A.

The storage device 24A includes a memory such as a hard disk drive, a read only memory (ROM), and a random access memory (RAM). The storage device 24A has a function of storing a program 211A and processing information (described later) required for various kinds of processing in the data processing device 25A.

The data processing device 25A comprises a microprocessor, for example a micro processing unit (MPU), or a central processing unit (CPU). The data processing device 25A has a function of implementing various processors configured to read the program 211A from the storage device 24A and to process data in accordance with the program 211A.

Main processors implemented by the data processing device 25A comprise a pre-calculation input processor 201A, an input processor 202A, an auxiliary vector generation processor 203, a vector multiplication processor 204, an auxiliary vector message authenticator generation processor 205, an input validity confirmation processor 206, and an output message authenticator generation processor 207.

That is, the data processing device 25A is different from the data processing device 25 illustrated in FIG. 3 in that the auxiliary vector message authenticator generation processor 205, the input validity confirmation processor 206, and the output message authenticator generation processor 207 are added, and details of processing by the pre-calculation input processor 201A and the input processor 202A are different.

The pre-calculation input processor 201A generates or is supplied with secret-shared data 212A on Beaver triples with message authenticators.

The storage device 24A stores the secret-shared data 212A on Beaver triples with message authenticators that are generated or are supplied by the pre-calculation input processor 201A. The secret-shared data 212A on Beaver triples with message authenticators is the same as the secret-shared data 116 on the sorted Beaver triples and message authenticators thereof, which is stored in the storage device 14A of FIG. 7.

The input processor 202A is supplied with a plurality of pieces of secret-shared data on a combination of two numbers to be multiplied by each other, and secret-shared data on a message authenticator of each of the plurality of combinations of two numbers to be multiplied by each other.

The storage device 24A stores secret-shared data 213A on pieces of data for multiplication, which is supplied from the input processor 202A. The secret-shared data 213A on pieces of data for multiplication comprises secret-shared data on a combination of two numbers to be multiplied by each other and corresponding secret-shared data on a message authenticator.

The auxiliary vector generation processor 203 adds each element of secret-shared data on Beaver triples to each piece of secret-shared data on a combination of two numbers to be multiplied by each other, and generates an auxiliary vector 216, which is a result of disclosure by the plurality of vector multiplication devices 20A communicating secret-shared data on an addition result to one another.

The storage device 24A stores the auxiliary vector 216 generated by the auxiliary vector generation processor 203.

The vector multiplication processor 204 uses the auxiliary vector 216 to generate secret-shared data 215 on a product from the secret-shared data on stirred Beaver triples.

The storage device 24A stores the secret-shared data 215 on a product, which is generated by the vector multiplication processor 204. The secret-shared data on a product is also referred to as "secret-shared data on vector multiplication result".

The auxiliary vector message authenticator generation processor 205 generates secret-shared data 217 on a message authenticator for the auxiliary vector 216 based on the secret-shared data on the message authenticator for the input and the secret-shared data on the message authenticators for the Beaver triples.

The storage device 24A stores the secret-shared data 217 on a message authenticator of the auxiliary vector, which is generated by the auxiliary vector message authenticator generation processor 205.

The storage device 24A stores secret-shared data 218 on keys of message authenticators described above. The secret-shared data 218 on keys of message authenticators is the same as the secret-shared data 115 on keys of message authenticators, which is stored in the storage device 14A illustrated in FIG. 7.

The input validity confirmation processor 206 verifies the auxiliary vector 216 based on the secret-shared data 217 on the message authenticator of the auxiliary vector, the auxiliary vector 216, and the secret-shared data 218 on keys of message authenticators.

The result of success or failure of inspection by the input validity confirmation processor 206 is produced by the output device 23.

The output message authenticator generation processor 207 generates, as an output message authenticator 219, secret-shared data on a message authenticator of the vector multiplication result based on the secret-shared data on the message authenticators of the Beaver triples, the auxiliary vector 216, the secret-shared data 218 on keys of message authenticators, and the secret-shared data on Beaver triples.

The storage device 24A stores the output message authenticator 219 generated by the output message authenticator generation processor 207. Further, the output message authenticator 219 is produced by the output device 23.

Figure 10:
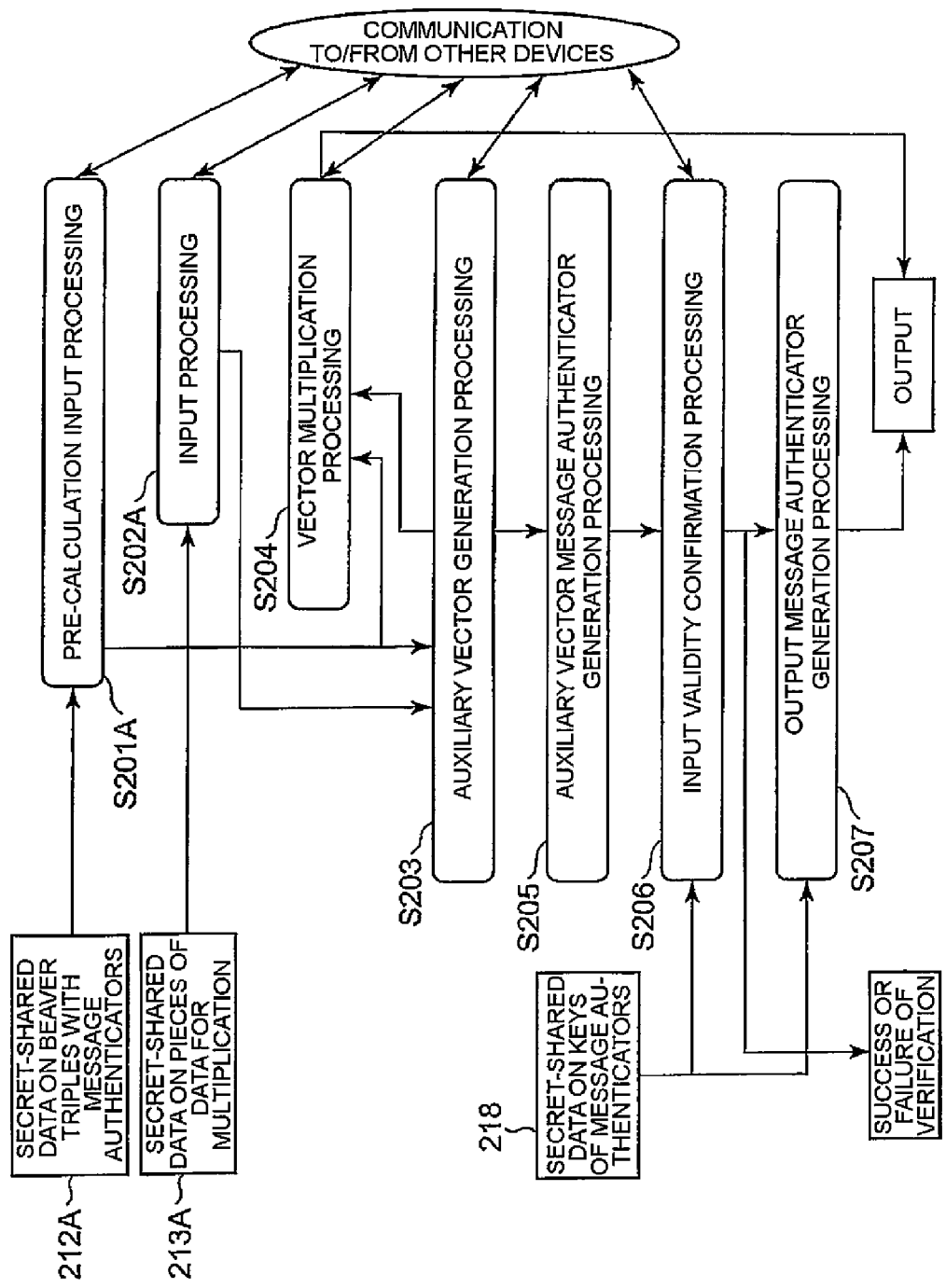
FIG. 10 is a flowchart for explaining operation of a data processing device used in the vector multiplication device illustrated in FIG. 9.

Next, referring to FIG. 10, a more detailed description will be given of processing to be performed by the processors 201A to 207 of the data processing device 25A of FIG. 9.

It is assumed that the pre-calculation input processor 201A is supplied with secret-shared data on Beaver triples with message authenticators described above for some k. This k is omitted. That is, it is assumed that the pre-calculation input processor 201A is supplied with $<a[j]>$, $<A[i]>$, $<b[j]>$, $<B[i]>$, $<c[j]>$, and $<C[i]>$ for all $j \in \{N\}$ and $i \in \{M\}$.

Those values are expected to satisfy the following relationship.

$c[j]=a[j]b[j]$, $A[i]=\Sigma_{j \in C\{N\}}\Gamma[i, j]a[j]$, $B[i]=\Sigma_{j \in C\{N\}}\Gamma[i, j]b[j]$, and $C[i]=\Sigma_{j \in \{N\}}\Gamma[i, j]c[j]$ for all $j \in \{N\}$ and $i \in \{M\}$.

This processing is referred to as "pre-calculation input processing" (Step S201A).

It is assumed that the input processor 202A is supplied with $<x[j]>$ and $<y[j]>$ for $j \in \{N\}$ as values to be multiplied by each other. Further, it is assumed that the input processor 202A is supplied with $<X[i]>$ and $<Y[i]>$ for $i \in \{M\}$ as message authenticators thereof.

Those values are expected to satisfy the relationship of $X[i]=\Sigma_{j\in\{N\}}\Gamma[i, j]x[j]$ and $Y[i]=\Sigma_{j\in\{N\}}\theta[i, j]y[j]$ for all $i\in\{M\}$.

This processing is referred to as "input processing" (Step S202A).

The auxiliary vector generation processor 203 first generates $d[j]=\text{Open}(<x[j]>+<a[j]>)$ for all $j\in\{N\}$.

Subsequently, the auxiliary vector generation processor 203 generates $e[j]=\text{Open}(<y[j]>+<b[j]>)$ for all $j\in\{N\}$.

This processing is referred to as "auxiliary vector generation processing" (Step S203).

The vector multiplication processor 204 generates $<z[j]>=<c[j]>+d[j]e[j]-e[j]<a[j]>-d[j]<b[j]>$ for all $j\in\{N\}$.

This processing is processing of multiplying vectors, and is a substantial object of this invention except for securing safety.

This processing is referred to as "vector multiplication processing" (Step S204).

The auxiliary vector message authenticator generation processor 205 first generates $<D[i]>=<X[i]>+<A[i]>$ for all $i\in\{M\}$.

Subsequently, the auxiliary vector message authenticator generation processor 205 generates $<E[i]>=<Y[i]>+<B[i]>$ for all $i\in\{M\}$.

The generated D[i] and E[i] serve as message authenticators of d[i] and e[i], respectively.

This processing is referred to as "auxiliary vector message authenticator generation processing" (Step S205).

The input validity confirmation processor 206 first confirms whether or not $0=\text{Open}(<D[i]>-\Sigma_{j\in\{N\}}d[j]<\Gamma[i, j]>)$ for all $i\in\{M\}$.

Subsequently, the input validity confirmation processor 206 confirms whether or not $0=\text{Open}(<E[i]>-\Sigma_{j\in\{N\}}e[j]<\Gamma[i, j]>)$ for all $i\in\{M\}$.

The validity of the message authenticator of an auxiliary vector is reduced to satisfaction of $D[i]-\Sigma_{j\in\{N\}}d[j]\Gamma[i, j]=0$, $E[i]-\Sigma_{j\in\{N\}}e[j]\Gamma[i, j]=0$. The input validity confirmation processor 206 calculates this expression while keeping the secret-shared state thereof, discloses the result, and confirms the validity. When the validity is confirmed, the message authenticators of x[j] and y[j] are confirmed to be valid on the assumption that the Beaver triples with message authenticators are valid.

This processing is referred to as "input validity confirmation processing" (Step S206).

The output message authenticator generation processor 207 generates $<Z[i]>=<C[i]>+\Sigma_{j\in\{N\}}d[j]e[j]<\Gamma[i,j]>-\text{Reshare}(\Sigma_{j\in\{N\}}e[j](<\Gamma[i,j]><a[j]>)+(\Sigma_{j\in\{N\}}d[j](<\Gamma[i,j]><b[j]>))$ for all $i\in\{M\}$.

Z[i] for $i\in\{M\}$ is a message authenticator of the output z[j]. When the input Beaver triples with message authenticators are valid, the message authenticator is valid.

This processing is referred to as "output message authenticator generation processing" (Step S207).

Next, effects of the vector multiplication system in the fifth example embodiment of this invention will be described. Vector multiplication is performed on a set of Beaver triples with message authenticators by using the latently safe vector multiplication method that uses Beaver triples with message authenticators. Therefore, there is an effect of ensuring that each multiplication is performed validly in the same proportion as that of valid Beaver triples.

Example Embodiment 6

Figure 11:
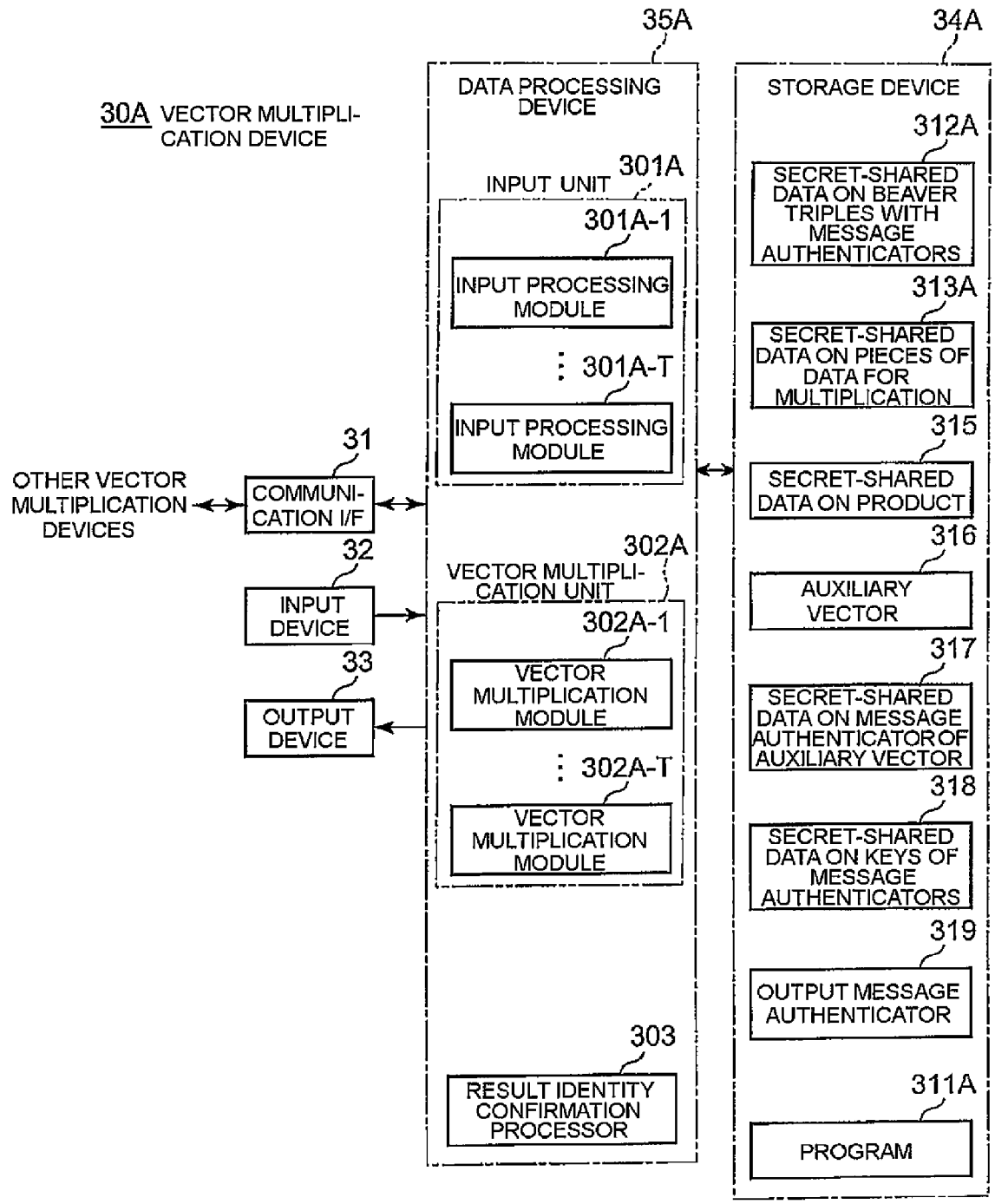
FIG. 11 is a block diagram for illustrating a hardware configuration of a vector multiplication device constructing a vector multiplication system in a sixth example embodiment of this invention.

FIG. 11 is a block diagram for illustrating a hardware configuration of a vector multiplication device 30A constructing a vector multiplication system in a sixth example embodiment of this invention. The illustrated vector multiplication device 30A may be implemented by a computer operating in accordance with program control.

The illustrated vector multiplication system comprises a safe vector multiplication system that uses Beaver triples with message authenticators.

The vector multiplication system comprises a system including the plurality of vector multiplication devices 30A capable of communicating to and from one another. The plurality of vector multiplication devices 30A have a function of secret sharing and holding keys of message authenticators among those vector multiplication devices 30A.

The vector multiplication device 30A comprises a communication interface (hereinafter referred to as "communication I/F") 31, an input device 32 configured to be supplied with data, an output device 33 configured to produce data, a storage device 34A storing a program and data described later, and a data processing device 35A configured to process data.

The communication I/F 31 comprises a dedicated data communication line. The communication I/F 31 has a function of transmitting and receiving data via a communication network (not shown) or in a wireless manner. Specifically, the communication I/F 31 transmits data to other vector multiplication devices, and receives data from other vector multiplication devices. The communication I/F 31 also has a function of sending the received data to the data processing device 35A.

The input device 32 comprises a keyboard, a mouse, and the like. The input device 32 has functions of detecting operation by an operator and of sending operation information to the data processing device 35A.

The output device 33 comprises a printer and a display device such as a liquid crystal display (LCD) or a plasma display panel (PDP). The output device 33 has functions of displaying various kinds of information, for example, an operation menu, and of printing and producing a final result in accordance with an instruction from the data processing device 35A.

The storage device 34A comprises a memory such as a hard disk drive, a read only memory (ROM), and a random access memory (RAM). The storage device 34A has a function of storing a program 311A and processing information (described later) required for various kinds of processing in the data processing device 35A.

The data processing device 35A comprises a microprocessor, for example a micro processing unit (MPU), or a central processing unit (CPU). The data processing device 35A has a function of implementing various processors configured to read the program 311A from the storage device 34A and to process data in accordance with the program 311A.

Main processors implemented by the data processing device 35A comprise an input unit 301A, a vector multiplication unit 302A, and a result identity confirmation processor 303.

The input unit 301A comprises first to T-th (T is an integer of 2 or more) input processing modules 301A-1 to 301A-T. The first to T-th input processing modules 301A-1 to 301A-T each comprise the pre-calculation processor 201A and the input processor 202A included in the data processing device 25A of FIG. 9.

The vector multiplication unit 302A comprises first to T-th vector multiplication modules 302A-1 to 302A-T. The first to T-th vector multiplication modules 302A-1 to 302A-T each comprise the auxiliary vector generation processor 203, the vector multiplication processor 204, the auxiliary vector message authenticator generation processor 205, the input validity confirmation processor 206, and the output message authenticator generation processor 207 included in the data processing device 25A of FIG. 9.

In other words, the first to T-th vector multiplication modules 302A-1 to 302A-T each execute a latently safe vector multiplication method that uses Beaver triples with message authenticators.

The result identity confirmation processor 303 confirms whether or not multiplication results of the first to T-th vector multiplication modules 302A-1 to 302A-T are all the same value.

The storage device 34A stores processing information similar to processing information stored in the storage device 24A illustrated in FIG. 9. That is, the storage device 34A stores secret-shared data 312A on Beaver triples with message authenticators, secret-shared data 313A on pieces of data for multiplication, secret-shared data 315 on a product, an auxiliary vector 316, a secret-shared data 317 on a message authenticator of an auxiliary vector, a secret-shared data 318 on keys of message authenticators, and an output message authenticator 319. The storage device 34A stores T pieces of such information unlike the storage device 24A.

Figure 12:
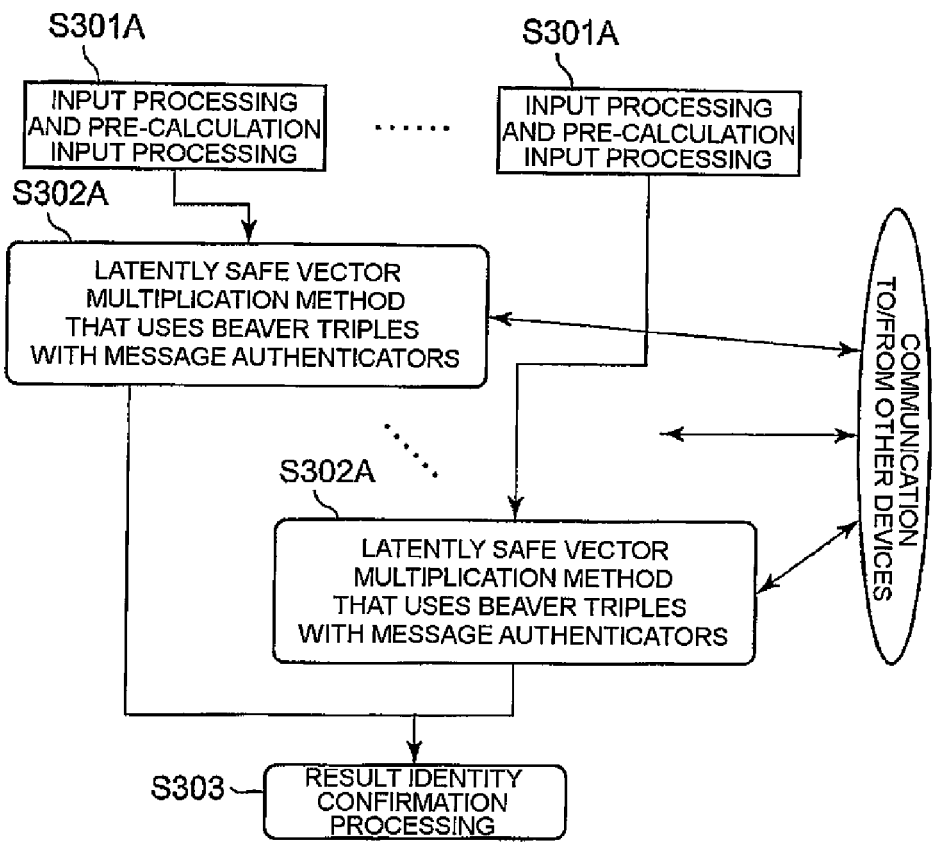
FIG. 12 is a flowchart for explaining operation of a data processing device used in the vector multiplication device illustrated in FIG. 11.

Next, referring to FIG. 12, a more detailed description will be given of processing to be performed by the processors 301A to 303 of the data processing device 35A of FIG. 11.

It is assumed that a duplicate number is denoted by T.

It is assumed that the input unit 301A is supplied with the same T value for one input (Step S301A), secret sharing of those inputs is independent of one another, and pieces of data held by respective participants for the same input are randomly distributed.

The vector multiplication unit 302A independently applies the latently safe multiplication method described above to T inputs (Step S302A).

After the application, the result identity confirmation processor 303 confirms the identity of all the results in the following way.

It is assumed that T results for some j are denoted by $<z^{(1)}[j]>, \ldots, <z^{(T)}[j]>$.

The result identity confirmation processor 303 confirms whether or not $0=\text{Open}(<z^{(u)}[j]>=<z^{(u+1)}[j]>)$ for all $u=1, \ldots, T-1$.

This processing is referred to as "result identity confirmation processing" (Step S303).

Those results are probabilistically confirmed numerous times, to thereby be able to reduce the number of Open operations.

In the latently safe method according to the fifth example embodiment described above, unless Beaver triples are generated validly, whether or not the multiplication result is valid cannot be confirmed. On the contrary, when a large number of Beaver triples are created and a fixed proportion thereof is inspected with the method of inspecting Beaver triples, the number of illegal Beaver triples that can be mixed has been suppressed to only a small fixed proportion of all the Beaver triples.

In the sixth example embodiment, a plurality of calculations are performed at the same time, and each calculation is based on a different Beaver triple. Therefore, it is possible to sufficiently increase the probability of at least one calculation being based on a valid Beaver triple. After that, when results of all the calculations are confirmed to be the same, it is ensured that the results of all the calculations are the same as the calculation result that is based on a valid Beaver triple.

Next, effects of the vector multiplication system in the sixth example embodiment of this invention will be described. Vector multiplication is performed on a set of Beaver triples with message authenticators with a safe vector multiplication method that uses Beaver triples with message authenticators. Therefore, there is an effect of ensuring that each multiplication is performed validly at an extraordinary high probability.

In this calculation, Rehash, Open, and Rand operations require communication. Considering that the numbers of those operations satisfy M<<N<<K, 5 times of communication is required for one multiplication with the latently safe method, and 5T times of communication is required for one multiplication with the safe method.

Next, effects of this invention will be described.

As described above, with use of this invention, it is possible to perform multiplication by distributing pieces of data among a plurality of devices and hiding each piece of data by each device. Any function can be calculated as well in consideration of a known method that enables addition. Further, it is possible to detect a fraud even when a participating device has committed the fraud. The amount of communication and calculation required for this calculation is small. Such a system prevents an administrator of a certain device from stealing data when secret data is handled in the device to provide a certain service. This is because when different administrators are assigned to a plurality of devices, no administrator can see the data stored in all the devices, which contributes to preventing the data from being stolen by the administrator in this way.

This invention is not strictly limited to the above-mentioned example embodiments, and may be embodied while the components are modified without departing from the gist thereof on an embodiment stage of this invention. Moreover, various inventions may be formed by properly combining a plurality of components.

A computer can be caused to execute the method described in this invention. A program for causing a computer to execute the method may be stored for distribution in a recording medium such as a magnetic disk, for example, a floppy (trademark) disk and a hard disk, an optical disc, for example, a compact disc-read only memory (CD-ROM) and a digital versatile disc (DVD), a magneto-optical disc (MO), and a semiconductor memory.

Moreover, as long as the recording medium can store a program and can be read by a computer, a storage form thereof may be any form.

Moreover, an operating system, middleware such as database management software and network software, or the like operating on a computer may execute a part of the respective pieces of the processing based on instructions of a program installed on the computer from the recording medium.

Further, the recording medium according to this invention is not limited to a medium independent of the computer, and includes a recording medium for storing or temporarily storing a downloaded program transmitted via a local area network (LAN), the Internet, or the like.

Moreover, the number of recording media is not limited to one. Even when processing described in the above-mentioned example embodiments is executed from a plurality of media, such media are included in the recording medium according to this invention, and a medium configuration may be any configuration.

The computer according to this invention executes the respective pieces of processing based on programs stored in a recording medium, and may include any configuration such as an apparatus including a personal computer or a system in which a plurality of apparatus are connected to each other via a network.

Moreover, the computer according to this invention is not limited to a personal computer. The computer includes an arithmetic processing apparatus included in an information processing apparatus, and comprises a device or apparatus capable of implementing the functions of this invention through use of a program.

The whole or part of the example embodiments disclosed above can be described as, but not limited to, the following supplementary notes.

Supplementary Note 1

A pre-calculation device (10; 10A), which is capable of communicating to and from a plurality of other pre-calculation devices, the pre-calculation device comprising:
a Beaver triple generation processor (101) configured to generate a large number of secret-shared Beaver triples by repeatedly using a function of generating two secret-shared random numbers and causing the pre-calculation device and the plurality of other pre-calculation devices to communicate a secret-shared value of a product of the two secret-shared random numbers to one another for generation thereof, to thereby cause the pre-calculation device and the plurality of other pre-calculation devices to secret share a combination of three values including the two secret-shared random numbers and the product thereof;
a Beaver triple random inspection processor (102) configured to:
   randomly select a secret-shared Beaver triple from among the large number of secret-shared Beaver triples;
   restore the secret-shared Beaver triple by the pre-calculation device and the plurality of other pre-calculation devices communicating the secret-shared Beaver triple to one another; and
   confirm that a product of first two elements is equal to a third element by using a value of the restored Beaver triple; and
a Beaver triple position stirring processor (103; 103A) configured to randomly replace Beaver triples that have not been restored, to generate replaced secret-shared Beaver triples.

Supplementary Note 2

A safe pre-calculation system, which is configured to pre-calculate Beaver triples, including the plurality of pre-calculation devices (10) of Supplementary Note 1 capable of communicating to and from one another.

Supplementary Note 3

A pre-calculation device (10A) according to Supplementary Note 1,
wherein the pre-calculation device (10A) has a function of secret sharing and holding keys of message authenticators among the pre-calculation device (10A) and the plurality of other pre-calculation devices,
wherein the Beaver triple position stirring processor (103A) is configured to randomly replace Beaver triples that have not been restored, to generate replaced secret-shared Beaver triples with new indices, and
wherein the pre-calculation device (10A) further comprises:
a Beaver triple message authenticator generation processor (104) configured to cause the pre-calculation device and the plurality of other pre-calculation devices to communicate secret-shared message authenticators of the replaced secret-shared Beaver triples to one another for generation thereof by using the secret-shared keys of message authenticators; and
a Beaver triple message authenticator verification processor (105) configured to perform the processing steps of:
   generating a large number of linear combinations of the replaced secret-shared Beaver triples and randomly selected coefficients, and restoring the large number of generated linear combinations to generate restored values; and
   confirming that a large number of generated linear combinations of the secret-shared message authenticators of the Beaver triples and the coefficients, and a large number of generated linear combinations of the restored values and the secret-shared keys of message authenticators are the same.

Supplementary Note 4

A safe pre-calculation system, which is configured to pre-calculate Beaver triples with message authenticators, including the plurality of pre-calculation devices (10A) of Supplementary Note 3 capable of communicating to and from one another.

Supplementary Note 5

A vector multiplication device (20; 20A), which is capable of communicating to and from a plurality of other vector multiplication devices, the vector multiplication device (20; 20A) comprising:
a pre-calculation input processor (201; 201A) configured to generate secret-shared data on Beaver triples or be supplied with the secret-shared data on Beaver triples;
an input processor (202; 202A) configured to be supplied with a plurality of pieces of secret-shared data on a combination of two numbers to be multiplied by each other;
an auxiliary vector generation processor (203) configured to:
   add each element of the secret-shared data on Beaver triples to each piece of secret-shared data on the combination of two numbers to be multiplied by each other; and
   generate an auxiliary vector, which is a result of disclosure by the vector multiplication device (20; 20A) and the plurality of other vector multiplication devices communicating secret-shared data on an addition result to one another; and
a vector multiplication processor (204) configured to generate secret-shared data on a vector multiplication result based on the auxiliary vector and the secret-shared data on Beaver triples.

Supplementary Note 6

A latently safe vector multiplication system, which is configured to use Beaver triples, including the plurality of vector multiplication devices (20) of Supplementary Note 5 capable of communicating to and from one another.

Supplementary Note 7

A vector multiplication device (20A) according to Supplementary Note 5, wherein the vector multiplication device (20A) has a function of secret sharing and holding keys of message authenticators among the vector multiplication device (20A) and the plurality of other vector multiplication devices, wherein the pre-calculation input processor (201A) is configured to generate secret-shared data on Beaver triples with message authenticators or be supplied with the secret-shared data on Beaver triples with message authenticators, wherein the input processor (202A) is configured to be supplied with a plurality of pieces of secret-shared data on a combination of two numbers to be multiplied by each other, and secret-shared data on a message authenticator of each of the plurality of combinations of two numbers to be multiplied by each other, and wherein the vector multiplication device (20A) further comprises:
- an auxiliary vector message authenticator generation processor (205) configured to generate secret-shared data on a message authenticator for the auxiliary vector based on the secret-shared data on the message authenticator for the input and the secret-shared data on the message authenticators for the Beaver triples;
- an input validity confirmation processor (206) configured to verify the auxiliary vector based on the secret-shared data on the message authenticator of the auxiliary vector, the auxiliary vector, and the secret-shared keys of message authenticators; and
- an output message authenticator generation processor (207) configured to generate, as an output message authenticator, secret-shared data on a message authenticator of the vector multiplication result based on the secret-shared data on the message authenticators of the Beaver triples, the auxiliary vector, the secret-shared keys of message authenticators, and the secret-shared data on Beaver triples.

Supplementary Note 8

A latently safe vector multiplication system, which is configured to use Beaver triples with message authenticators, including the plurality of vector multiplication devices (20A) of Supplementary Note 7 capable of communicating to and from one another.

Supplementary Note 9

A vector multiplication device (30), which is capable of communicating to and from a plurality of other vector multiplication devices, the vector multiplication device comprising:

a plurality of sets of the pre-calculation input processor (201), the input processor (202), the auxiliary vector generation processor (203), and the vector multiplication processor (204), each of the sets constructing the vector multiplication device (20) of Supplementary Note 5; and a result identity confirmation processor (303) configured to confirm that a plurality of pieces of secret-shared data on the vector multiplication result are all the same value.

Supplementary Note 10

A safe vector multiplication system, which is configured to use Beaver triples, including the plurality of vector multiplication devices (30) of Supplementary Note 9 capable of communicating to and from one another.

Supplementary Note 11

A vector multiplication device (30A), which is capable of communicating to and from a plurality of other vector multiplication devices and has a function of secret sharing and holding keys of message authenticators among the vector multiplication device (30A) and the plurality of other vector multiplication devices, the vector multiplication device (30A) comprising:

a plurality of sets of the pre-calculation input processor (201A), the input processor (202A), the auxiliary vector generation processor (203), the vector multiplication processor (204), the auxiliary vector message authenticator generation processor (205), the input validity confirmation processor (206), and the output message authenticator generation processor (207), each of the sets constructing the vector multiplication device (20A) of Supplementary Note 7; and a result identity confirmation processor (303) configured to confirm that a plurality of pieces of secret-shared data on the vector multiplication result are all the same value.

Supplementary Note 12

A safe vector multiplication system, which is configured to use Beaver triples with message authenticators, including the plurality of vector multiplication devices (30A) of Supplementary Note 11 capable of communicating to and from one another.

Supplementary Note 13

A pre-calculation calculation method, which is performed by a pre-calculation device (10) capable of communicating to and from a plurality of other pre-calculation devices, the pre-calculation calculation method comprising:

generating, by a Beaver triple generation processor (101), a large number of secret-shared Beaver triples by repeatedly using a function of generating two secret-shared random numbers and causing the pre-calculation device and the plurality of other pre-calculation devices to communicate a secret-shared value of a product of the two secret-shared random numbers to one another for generation thereof, to thereby cause the pre-calculation device and the plurality of other pre-calculation devices to secret share a combination of three values including the two secret-shared random numbers and the product thereof;

randomly selecting, by a Beaver triple random inspection processor (102), a secret-shared Beaver triple from among the large number of secret-shared Beaver triples;

restoring, by the Beaver triple random inspection processor (102), the secret-shared Beaver triple by the pre-calculation device and the plurality of other pre-calculation devices communicating the secret-shared Beaver triple to one another;

confirming, by the Beaver triple random inspection processor (102), that a product of first two elements is equal to a third element by using a value of the restored Beaver triple; and randomly replacing, by a Beaver triple position stirring processor (103), Beaver triples that have not been restored, to generate replaced secret-shared Beaver triples.

Supplementary Note 14

A vector multiplication method, which is performed by a vector multiplication device (20) capable of communicating to and from a plurality of other vector multiplication devices, the vector multiplication method comprising:

generating, by a pre-calculation input processor (201), secret-shared data on Beaver triples, or being supplied with, by the pre-calculation input processor, secret-shared data on Beaver triples;

being supplied with, by an input processor (202), a plurality of pieces of secret-shared data on a combination of two numbers to be multiplied by each other;

adding, by an auxiliary vector generation processor (203), each element of the secret-shared data on Beaver triples to each piece of secret-shared data on the combination of two numbers to be multiplied by each other; and generating, by the auxiliary vector generation processor (203), an auxiliary vector, which is a result of disclosure by the vector multiplication device (20) and the plurality of other vector multiplication devices communicating secret-shared data on an addition result to one another; and generating, by a vector multiplication processor (204), secret-shared data on a vector multiplication result based on the auxiliary vector and the secret-shared data on Beaver triples.

Supplementary Note 15

A vector multiplication method according to Supplementary Note 14, further comprising:

performing, by the pre-calculation input processor (201), the input processor (202), the auxiliary vector generation processor (203), and the vector multiplication processor (204), each of the processing steps a plurality of times; and confirming, by a result identity confirmation processor (303), that a plurality of pieces of secret-shared data on the vector multiplication result are all the same value.

Supplementary Note 16

A pre-calculation calculation method, which is performed by a pre-calculation device (10A), which is capable of communicating to and from a plurality of other pre-calculation devices and has a function of secret sharing and holding keys of message authenticators among the pre-calculation device (10A) and the plurality of other pre-calculation devices, the pre-calculation calculation method including:

generating, by a Beaver triple generation processor (101), a large number of secret-shared Beaver triples by repeatedly using a function of generating two secret-shared random numbers and causing the pre-calculation device and the plurality of other pre-calculation devices to communicate a secret-shared value of a product of the two secret-shared random numbers to one another for generation thereof, to thereby cause the pre-calculation device and the plurality of other pre-calculation devices to secret share a combination of three values including the two secret-shared random numbers and the product thereof;

randomly selecting, by a Beaver triple random inspection processor (102), a secret-shared Beaver triple from among the large number of secret-shared Beaver triples;

restoring, by the Beaver triple random inspection processor (102), the secret-shared Beaver triple by the pre-calculation device and the plurality of other pre-calculation devices communicating the secret-shared Beaver triple to one another;

confirming, by the Beaver triple random inspection processor (102), that a product of first two elements is equal to a third element by using a value of the restored Beaver triple;

randomly replacing, by a Beaver triple position stirring processor (103A), Beaver triples that have not been restored, to generate replaced secret-shared Beaver triples with new indices;

causing, by a Beaver triple message authenticator generation processor (104), the pre-calculation device and the plurality of other pre-calculation devices to communicate secret-shared message authenticators of the replaced secret-shared Beaver triples to one another for generation thereof by using the secret-shared keys of message authenticators; and performing, by a Beaver triple message authenticator verification processor (105), the processing steps of:

generating a large number of linear combinations of the replaced secret-shared Beaver triples and randomly selected coefficients, and restoring the large number of generated linear combinations to generate restored values; and confirming that a large number of generated linear combinations of the secret-shared message authenticators of the Beaver triples and the coefficients, and a large number of generated linear combinations of the restored values and the secret-shared keys of message authenticators are the same.

Supplementary Note 17

A vector multiplication method, which is performed by a vector multiplication device (20A), which is capable of communicating to and from a plurality of other vector multiplication devices and has a function of secret sharing and holding keys of message authenticators among the vector multiplication calculation device (20A) and the plurality of other vector multiplication devices, the vector multiplication method including:

generating, by a pre-calculation input processor (201A), secret-shared data on Beaver triples with message authenticators, or be supplied with, by the pre-calculation input processor (201A), the secret-shared data on Beaver triples with message authenticators;

inputting, by an input processor (202A), a plurality of pieces of secret-shared data on a combination of two numbers to be multiplied by each other, and secret-shared data on a message authenticator of each of the plurality of combinations of two numbers to be multiplied by each other;

adding, by an auxiliary vector generation processor (203), each element of the secret-shared data on Beaver triples to each piece of secret-shared data on the combination of two numbers to be multiplied by each other;

generating, by the auxiliary vector generation processor (203), an auxiliary vector, which is a result of disclosure by the vector multiplication device (20A) and the plurality of other vector multiplication devices communicating secret-shared data on an addition result to one another;

generating, by a vector multiplication processor (204), secret-shared data on a vector multiplication result based on the auxiliary vector and the secret-shared data on Beaver triples;

generating, by an auxiliary vector message authenticator generation processor (205), secret-shared data on a message authenticator for the auxiliary vector based on the secret-shared data on the message authenticator for the input and the secret-shared data on the message authenticators for the Beaver triples;

verifying, by an input validity confirmation processor (206), the auxiliary vector based on the secret-shared data on the message authenticator of the auxiliary vector, the auxiliary vector, and the secret-shared keys of message authenticators; and generating, by an output message authenticator generation processor (207), as an output message authenticator, secret-shared data on a message authenticator of the vector multiplication result based on the secret-shared data on the message authenticators of the Beaver triples, the auxiliary vector, the secret-shared keys of message authenticators, and the secret-shared data on Beaver triples.

Supplementary Note 18

A vector multiplication method according to Supplementary Note 17, further including:

performing, by the pre-calculation input processor (201A), the input processor (202A), the auxiliary vector generation processor (203), the vector multiplication processor (204), the auxiliary vector message authenticator generation processor (205), the input validity confirmation processor (206), and the output message authenticator generation processor (207), each of the processing steps a plurality of times; and confirming, by a result identity confirmation processor (303), that a plurality pieces of secret-shared data on the vector multiplication result are all the same value.

Supplementary Note 19

A computer-readable recording medium having stored thereon a pre-calculation program for causing a computer of a pre-calculation device (10) capable of communicating to and from a plurality of other pre-calculation devices to function as:

Beaver triple generation processing means (101) for generating a large number of secret-shared Beaver triples by repeatedly using a function of generating two secret-shared random numbers and causing the pre-calculation device and the plurality of other pre-calculation devices to communicate a secret-shared value of a product of the two secret-shared random numbers to one another for generation thereof, to thereby cause the pre-calculation device and the plurality of other pre-calculation devices to secret share a combination of three values including the two secret-shared random numbers and the product thereof;

Beaver triple random inspection processing means (102) for:
- randomly selecting a secret-shared Beaver triple from among the large number of secret-shared Beaver triples;
- restoring the secret-shared Beaver triple by the pre-calculation device and the plurality of other pre-calculation devices communicating the secret-shared Beaver triple to one another; and
- confirming that a product of first two elements is equal to a third element by using a value of the restored Beaver triple; and Beaver triple position stirring processing means (103) for randomly replacing Beaver triples that have not been restored, to generate replaced secret-shared Beaver triples.

Supplementary Note 20

A computer-readable recording medium having stored thereon a vector multiplication program for causing a computer of a vector multiplication device (20) capable of communicating to and from a plurality of other vector multiplication devices to function as:

pre-calculation input processing means (201) for generating secret-shared data on Beaver triples or being supplied with the secret-shared data on Beaver triples;

input processing means (202) for be supplied with a plurality of pieces of secret-shared data on a combination of two numbers to be multiplied by each other;

auxiliary vector generation processing means (203) for:
- adding each element of the secret-shared data on Beaver triples to each piece of secret-shared data on the combination of two numbers to be multiplied by each other; and
- generating an auxiliary vector, which is a result of disclosure by the vector multiplication device and the plurality of other vector multiplication devices communicating secret-shared data on an addition result to one another; and vector multiplication processing means (204) for generating secret-shared data on a vector multiplication result based on the auxiliary vector and the secret-shared data on Beaver triples.

Supplementary Note 21

A computer-readable recording medium having stored thereon a vector multiplication program for causing a computer of a vector multiplication device (30) capable of communicating to and from a plurality of other vector multiplication devices to function as:

the plurality of pre-calculation input processing means, input processing means, auxiliary vector generation processing means, and vector multiplication processing means of Supplementary Note 20; and result identity confirmation processing means for confirming that a plurality of pieces of secret-shared data on the vector multiplication result are all the same value.

Supplementary Note 22

A computer-readable recording medium having stored thereon a pre-calculation program for causing a computer of a pre-calculation device (10A), which is capable of communicating to and from a plurality of other vector multiplication devices and has a function of secret sharing and holding keys of message authenticators among the pre-calculation device (10A) and the plurality of other pre-calculation devices, to function as:

Beaver triple generation processing means (101) for generating a large number of secret-shared Beaver triples by repeatedly using a function of generating two secret-shared random numbers and causing the pre-calculation device and the plurality of other pre-calculation devices to communicate a secret-shared value of a product of the two secret-shared random numbers to one another for generation thereof, to thereby cause the pre-calculation device and the plurality of other pre-calculation devices to secret share a combination of three values including the two secret-shared random numbers and the product thereof;

Beaver triple random inspection processing means (102) for:
- randomly selecting a secret-shared Beaver triple from among the large number of secret-shared Beaver triples;
- restoring the secret-shared Beaver triple by the pre-calculation device and the plurality of other pre-calculation devices communicating the secret-shared Beaver triple to one another; and confirming that a product of first two elements is equal to a third element by using a value of the restored Beaver triple;

Beaver triple position stirring processing means (103A) for randomly replacing Beaver triples that have not been restored, to generate replaced secret-shared Beaver triples with new indices;

Beaver triple message authenticator generation processing means (104) for causing the pre-calculation device and the plurality of other pre-calculation devices to communicate secret-shared message authenticators of the replaced secret-shared Beaver triples to one another for generation thereof by using the secret-shared keys of message authenticators; and Beaver triple message authenticator verification processing means (105) for performing the processing steps of:
  generating a large number of linear combinations of the replaced secret-shared Beaver triples and randomly selected coefficients, and restoring the large number of generated linear combinations to generate restored values; and
  confirming that a large number of generated linear combinations of the secret-shared message authenticators of the Beaver triples and the coefficients, and a large number of generated linear combinations of the restored values and the secret-shared keys of message authenticators are the same.

Supplementary Note 23

A computer-readable recording medium having stored thereon a vector multiplication program for causing a computer of a vector multiplication device (20A), which is capable of communicating to and from a plurality of other vector multiplication devices and has a function of secret sharing and holding keys of message authenticators among the vector multiplication device (20A) and the plurality of other vector multiplication devices, to function as:

pre-calculation input processing means (201A) for generating secret-shared data on Beaver triples with message authenticators or being supplied with the secret-shared data on Beaver triples with message authenticators;

input processing means (202A) for being supplied with a plurality of pieces of secret-shared data on the combination of two numbers to be multiplied by each other, and secret-shared data on a message authenticator of each of the plurality of combinations of two numbers to be multiplied by each other;

auxiliary vector generation processing means (203) for:
  adding each element of the secret-shared data on Beaver triples to each piece of secret-shared data on the combination of two numbers to be multiplied by each other; and
  generating an auxiliary vector, which is a result of disclosure by the vector multiplication device and the plurality of other vector multiplication devices communicating secret-shared data on an addition result to one another;
  vector multiplication processing means (204) for generating secret-shared data on a vector multiplication result based on the auxiliary vector and the secret-shared data on Beaver triples;

auxiliary vector message authenticator generation processing means (205) for generating secret-shared data on a message authenticator for the auxiliary vector based on the secret-shared data on the message authenticator for the input and the secret-shared data on the message authenticators for the Beaver triples;

input validity confirmation processing means (206) for verifying the auxiliary vector based on the secret-shared data on the message authenticator of the auxiliary vector, the auxiliary vector, and the secret-shared keys of message authenticators; and output message authenticator generation processing means (207) for generating, as an output message authenticator, secret-shared data on a message authenticator of the vector multiplication result based on the secret-shared data on the message authenticators of the Beaver triples, the auxiliary vector, the secret-shared keys of message authenticators, and the secret-shared data on Beaver triples.

Supplementary Note 24

A computer-readable recording medium having stored thereon a vector multiplication program for causing a computer of a vector multiplication device (30A), which is capable of communicating to and from a plurality of other vector multiplication devices and has a function of secret sharing and holding keys of message authenticators among the vector multiplication device (30A) and the plurality of other pre-calculation devices, to function as:

the plurality of pre-calculation input processing means (201A), input processing means (202A), auxiliary vector generation processing means (203), vector multiplication processing means (204), auxiliary vector message authenticator generation processing means (205), input validity confirmation processing means (206), and output message authenticator generation processing means (207) of Supplementary Note 23; and result identity confirmation processing means (303) for confirming that a plurality of pieces of secret-shared data on the vector multiplication result are all the same value.

This application is based upon and claims the benefit of priority from Japanese Patent Application No. 2015-241251, filed on Dec. 10, 2015, the disclosure of which is incorporated herein in its entirety by reference.

REFERENCE SIGNS LIST 10, 10A pre-calculation device
11 communication I/F
12 input device
13 output device
14, 14A storage device
15, 15A data processing device
101 Beaver triple generation processor
102 Beaver triple random inspection processor
103, 103A Beaver triple position stirring processor
104 Beaver triple message authenticator generation processor
105 Beaver triple message authenticator verification processor
111, 111A program
112 random number
113 secret-shared data on Beaver triple
114, 114A secret-shared data on stirred Beaver triples
115 secret-shared data on key of message authenticator
116 secret-shared data on stirred Beaver triple and message authenticator thereof
20, 20A, 30, 30A vector multiplication device
21, 31 communication I/F
22, 32 input device 23, 33 output device
24, 24A, 34, 34A storage device
25, 25A, 35, 35A data processing device
201, 201A pre-calculation input processor
202, 202A input processor
203 auxiliary vector generation processor
204 vector multiplication processor
205 auxiliary vector message authenticator generation processor
206 input validity confirmation processor
207 output message authenticator generation processor
211, 211A, 311, 311A program
212, 312 secret-shared data on Beaver triple
212A, 312A secret-shared data with message authenticator on Beaver triple
213, 313 secret-shared data on pieces of data for multiplication
213A, 313A secret-shared data on pieces of data for multiplication
215, 315 secret-shared data on product
216, 316 auxiliary vector
217, 317 secret-shared data on message authenticator of auxiliary vector
218, 318 secret-shared data on keys of message authenticator
219, 319 output message authenticator
301 input unit
301A input unit
301-1 to 301-T input processing module
301A-1 to 301A-T input processing module
302 vector multiplication unit
302A vector multiplication unit
302-1 to 302-T vector multiplication module
302A-1 to 302A-T vector multiplication module
303 result identity confirmation processor

The invention claimed is:

1. A vector multiplication device, which is capable of communicating to and from a plurality of other vector multiplication devices, the vector multiplication device comprising:
a pre-calculation input hardware processor configured to generate secret-shared data on Beaver triples or be supplied with the secret-shared data on Beaver triples;
an input processor configured to be supplied with a plurality of pieces of secret-shared data on a combination of two numbers to be multiplied by each other;
an auxiliary vector generation processor configured to:
add each element of the secret-shared data on Beaver triples to each piece of secret-shared data on the combination of two numbers to be multiplied by each other; and
generate an auxiliary vector, which is a result of disclosure by the vector multiplication device and the plurality of other vector multiplication devices communicating secret-shared data on an addition result to one another; and
a vector multiplication processor configured to generate secret-shared data on a vector multiplication result based on the auxiliary vector and the secret-shared data on Beaver triples.

2. The vector multiplication device according to claim 1, wherein the vector multiplication device has a function of secret sharing and holding keys of message authenticators among the vector multiplication device and the plurality of other vector multiplication devices,
wherein the pre-calculation input hardware processor is configured to generate secret-shared data on Beaver triples with message authenticators or be supplied with the secret-shared data on Beaver triples with message authenticators,
wherein the input processor is configured to be supplied with a plurality of pieces of secret-shared data on a combination of two numbers to be multiplied by each other, and secret-shared data on a message authenticator of each of the plurality of combinations of two numbers to be multiplied by each other, and
wherein the vector multiplication device further comprises:
an auxiliary vector message authenticator generation processor configured to generate secret-shared data on a message authenticator for the auxiliary vector based on the secret-shared data on the message authenticator for the input and the secret-shared data on the message authenticators for the Beaver triples;
an input validity confirmation processor configured to inspect the auxiliary vector based on the secret-shared data on the message authenticator of the auxiliary vector, the auxiliary vector, and the secret-shared keys of message authenticators; and
an output message authenticator generation processor configured to generate, as an output message authenticator, secret-shared data on a message authenticator of the vector multiplication result based on the secret-shared data on the message authenticators of the Beaver triples, the auxiliary vector, the secret-shared keys of message authenticators, and the secret-shared data on Beaver triples.

3. The vector multiplication device according to claim 2, which is capable of communicating to and from a plurality of other vector multiplication devices and has a function of secret sharing and holding keys of message authenticators among the vector multiplication device and the plurality of other vector multiplication devices, wherein the vector multiplication device further comprising:
a plurality of sets of the pre-calculation input hardware processor, the input processor, the auxiliary vector generation processor, the vector multiplication processor, the auxiliary vector message authenticator generation processor, the input validity confirmation processor, and the output message authenticator generation processor; and
a result identity confirmation processor configured to confirm that a plurality of pieces of secret-shared data on the vector multiplication result are all the same value.

4. The vector multiplication device according to claim 1, which is capable of communicating to and from a plurality of other vector multiplication devices, wherein the vector multiplication device further comprising:
a plurality of sets of the pre-calculation input hardware processor, the input processor, the auxiliary vector generation processor, and the vector multiplication processor; and
a result identity confirmation processor configured to confirm that a plurality of pieces of secret-shared data on the vector multiplication result are all the same value.

5. A vector multiplication method, which is performed by a vector multiplication device capable of communicating to and from a plurality of other vector multiplication devices, the vector multiplication method comprising:

generating, by a pre-calculation input processor, secret-shared data on Beaver triples, or being supplied with, by the pre-calculation input processor, secret-shared data on Beaver triples;

being supplied with, by an input processor, a plurality of pieces of secret-shared data on a combination of two numbers to be multiplied by each other;

adding, by an auxiliary vector generation processor, each element of the secret-shared data on Beaver triples to each piece of secret-shared data on the combination of two numbers to be multiplied by each other; and generating, by the auxiliary vector generation processor, an auxiliary vector, which is a result of disclosure by the vector multiplication device and the plurality of other vector multiplication devices communicating secret-shared data on an addition result to one another; and generating, by a vector multiplication processor, secret-shared data on a vector multiplication result based on the auxiliary vector and the secret-shared data on Beaver triples.

6. The vector multiplication method according to claim 5, further comprising:

performing, by the pre-calculation input processor, the input processor, the auxiliary vector generation processor, and the vector multiplication processor, each of the processing steps a plurality of times; and confirming, by a result identity confirmation processor, that a plurality of pieces of secret-shared data on the vector multiplication result are all the same value.

* * * * *